US012626847B2

(12) United States Patent
Tokoro et al.

(10) Patent No.: US 12,626,847 B2
(45) Date of Patent: May 12, 2026

(54) MAGNETIC CORE AND MAGNETIC COMPONENT

(71) Applicant: TDK CORPORATION, Tokyo (JP)

(72) Inventors: Seigo Tokoro, Tokyo (JP); Kazuhiro Yoshidome, Tokyo (JP); Akito Hasegawa, Tokyo (JP); Nobuhiro Okuda, Tokyo (JP)

(73) Assignee: TDK CORPORATION, Tokyo (JP)

( * ) Notice: Subject to any disclaimer, the term of this patent is extended or adjusted under 35 U.S.C. 154(b) by 734 days.

(21) Appl. No.: 18/169,297

(22) Filed: Feb. 15, 2023

(65) Prior Publication Data

US 2023/0268107 A1 Aug. 24, 2023

(30) Foreign Application Priority Data

Feb. 21, 2022 (JP) ................................ 2022-024883

(51) Int. Cl.
*H01F 3/08* (2006.01)
*H01F 1/20* (2006.01)
*H01F 1/33* (2006.01)

(52) U.S. Cl.
CPC ................ *H01F 3/08* (2013.01); *H01F 1/20* (2013.01); *H01F 1/33* (2013.01)

(58) Field of Classification Search
CPC ..... H01F 1/14; H01F 1/20; H01F 3/08; H01F 1/33; H01F 27/255; H01F 27/28
USPC .......................................................... 336/233
See application file for complete search history.

(56) References Cited

U.S. PATENT DOCUMENTS

2011/0285486 A1* 11/2011 Maeda .................... B22F 1/102 335/297
2013/0228717 A1* 9/2013 Harada ..................... H01F 1/01 252/62.55
2017/0154720 A1* 6/2017 Ohkubo .................. H01F 17/04
2020/0135380 A1* 4/2020 Tonoyama .......... H01F 17/0013
2021/0183548 A1* 6/2021 Ishida ................. H01F 1/14741
2022/0254553 A1* 8/2022 Nakazawa .............. C22C 45/02

FOREIGN PATENT DOCUMENTS

JP 2021-176167 A 11/2021

* cited by examiner

*Primary Examiner* — Tszfung J Chan
(74) *Attorney, Agent, or Firm* — Oliff PLC

(57) ABSTRACT

A magnetic core, containing metal magnetic powder and resin, in which a content of the metal magnetic powder satisfies 60%≤(A1/A2)≤90%. The metal magnetic powder includes small particles having the Heywood diameter of 1 μm or less in the cross section of the magnetic core and large particles having the Heywood diameter of 5 μm or more and less than 40 μm. An edge-to-edge distance regarding to a distance between the small particles satisfies 5≤((L1av/dav)×100)≤70. An edge-to-edge distance regarding to a distance between the small particles and the large particles satisfies 0.02 μm≤L2av≤0.13 μm and σ≤0.25 μm.

4 Claims, 7 Drawing Sheets

MAGNETIC CORE AND MAGNETIC COMPONENT

TECHNICAL FIELD

The present disclosure relates to a magnetic core and a magnetic component.

BACKGROUND

Magnetic components such as inductors, transformers, and choke coils are widely used in power supply circuits of various electronic devices. In recent years, in order to realize a low-carbon society, reduction of energy loss in power supply circuits and improvement of power supply efficiency are considered important, and higher efficiency and energy saving of magnetic components are required.

In order to satisfy the above requirements for the magnetic component, it is essential to improve relative magnetic permeability of a magnetic core included in the magnetic component. In order to improve the relative magnetic permeability of the magnetic core, it is necessary to increase a packing rate of magnetic powder contained in the magnetic core. Therefore, in the field of magnetic components, various attempts are made to improve the packing rate of the magnetic powder in the magnetic core. For example, Patent Document 1 discloses that a packing density of the magnetic powder can be increased by adjusting an edge-to-edge distance between large particles and a distance between centroids of coarse particles within predetermined ranges.

However, increasing the packing rate of the magnetic powder increases the number of contact points between magnetic particles, which tends to lower a withstand voltage of the magnetic core. The increase in the number of contact points between the magnetic particles causes local magnetic saturation, and degrades DC bias characteristics. In other words, there is a trade-off relation between the packing rate (relative magnetic permeability) and the withstand voltage and the DC bias characteristics, and it is difficult to improve both the withstand voltage characteristics and the DC bias characteristics in a state where the packing rate (relative magnetic permeability) is high.

Patent Document 1: JP2021176167 (A)

SUMMARY

The present disclosure has been achieved in view of the above circumstances, and an object of the present disclosure is to provide a magnetic core having both a high withstand voltage and excellent DC bias characteristics, and a magnetic component including the magnetic core.

In order to achieve the above object, a magnetic core according to the present disclosure contains:

metal magnetic powder; and resin, in which a content of the metal magnetic powder satisfies $60\% \leq (A1/A2) \leq 90\%$, in which A1 is an area of the metal magnetic powder in a cross section of the magnetic core, and A2 is a total area of the metal magnetic powder and the resin in the cross section of the magnetic core, the metal magnetic powder includes small particles having the Heywood diameter of 1 μm or less in the cross section of the magnetic core and large particles having the Heywood diameter of 5 μm or more and less than 40 μm, a neighborhood region of each small particle is defined as a region within a circle with a radius of $3 \times r_N$ from a centroid of each small particle as a center of the circle in the cross section of the magnetic core, in which $r_N$ is a radius of each of the small particles, L1 is defined as an edge-to-edge distance between the small particle positioned in a center of the neighborhood region of each small particle and the small particle farthest from the center in the neighborhood region of each small particle, a ratio of L1av to day satisfies $5 \leq ((L1av/dav) \times 100) \leq 70$, in which L1av is an average value of L1 and dav is an average value of the Heywood diameters of the small particles, L2 is defined as an edge-to-edge distance between a randomly selected large particle in the cross section of the magnetic core and a small particle adjacent to the randomly selected large particle, L2av is 0.02 μm or more and 0.13 μm or less, in which L2av is an average value of L2, and σ is 0.25 μm or less, in which σ is a standard deviation of L2.

Since the magnetic core has the above feature, it is possible to improve the withstand voltage and the DC bias characteristics as compared with magnetic cores in the related art while maintaining a high relative magnetic permeability thereof.

Preferably, an average roundness of the large particles in the cross section of the magnetic core is 0.8 or more.

Preferably, a ratio of S1 to S2 satisfies $0.2 \leq (S1/S2) \leq 0.5$, in which S1 is an area of the small particles in the cross section of the magnetic core, and S2 is an area of the large particles in the cross section of the magnetic core.

The magnetic core of the present disclosure can be applied to various magnetic components such as inductors, transformers, and choke coils.

BRIEF DESCRIPTION OF THE DRAWING(S)

DETAILED DESCRIPTION

Hereinafter, the present disclosure is described in detail based on an embodiment shown in the figures.

External dimensions and shape of a magnetic core 2 according to the present embodiment are not particularly limited as long as it is formed into a predetermined shape. As shown in a schematic cross-sectional view of FIG. 1, the magnetic core 2 contains at least metal magnetic powder 10 and resin 20, and particles forming the metal magnetic powder 10 are combined via the resin 20 so that the magnetic core 2 is formed into a predetermined shape.

Figure 1:
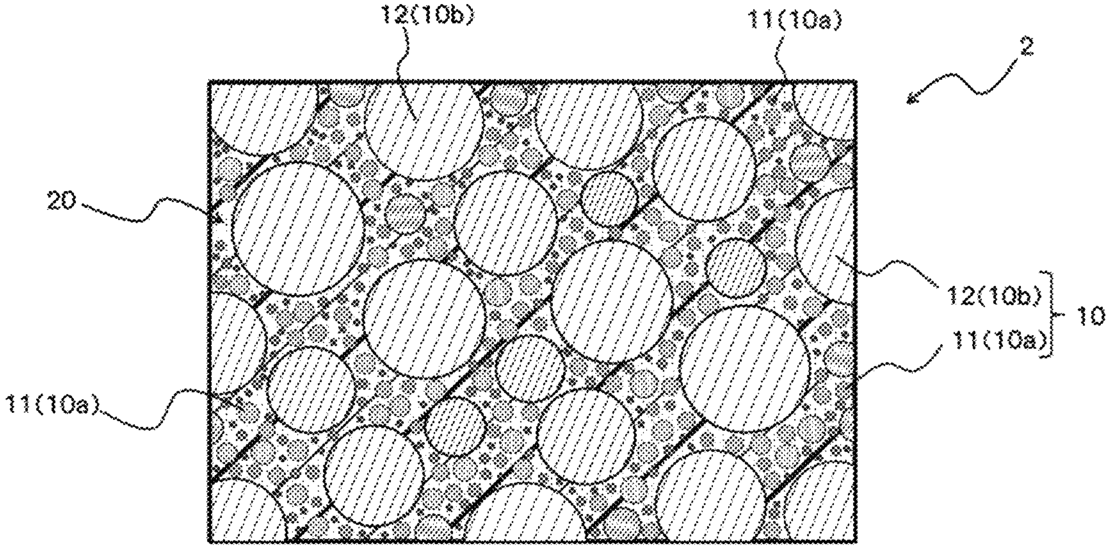
FIG. 1 is a schematic cross-sectional view showing a magnetic core according to an embodiment of the present disclosure.

An area of the metal magnetic powder 10 occupied in a cross section of the magnetic core 2 is defined as A1, and a total area of the metal magnetic powder 10 and the resin 20 is defined as A2. A2 corresponds to an area of a randomly selected cross section of the magnetic core 2 as shown in FIG. 1, and a packing rate of the metal magnetic powder 10 in the magnetic core 2 can be expressed as A1/A2. A1/A2 in the magnetic core 2 is 60% or more and 90% or less, and preferably 75% or more and 90% or less. Note that A1/A2 may be calculated by analyzing the cross section of the magnetic core 2 using an electron microscope or the like. For example, a randomly selected cross section of the magnetic core 2 is divided into a plurality of continuous fields of view for observation, and an area of the metal magnetic powder contained in each field of view is measured. In this case, it is preferable that an area per field of view is set to an area equivalent to 100 μm×100 μm, and the number of fields of view to be observed is at least 100. That is, it is preferable to calculate A1/A2 setting a total area of the fields of view when measuring A1 to at least 1000000 $\mu m^2$.

The metal magnetic powder 10 is constituted by soft magnetic metal particles, and contains small particles 11 having the Heywood diameter of 1 μm or less and large particles 12 having the Heywood diameter of 5 μm or more and less than 40 In addition to the small particles 11 and the large particles 12, the metal magnetic powder 10 may contain medium particles having the Heywood diameter of more than 1 μm and less than 5 μm, and coarse particles having the Heywood diameter of 40 μm or more. Note that the "Heywood diameter" in the present embodiment means a circle equivalent diameter of each particle observed in the cross section of the magnetic core 2. Specifically, assuming that an area of each soft magnetic metal particle in the cross section of the magnetic core 2 is S, the Heywood diameter of each soft magnetic metal particle is represented by $(4S/\pi)^{1/2}$.

Figure 2:
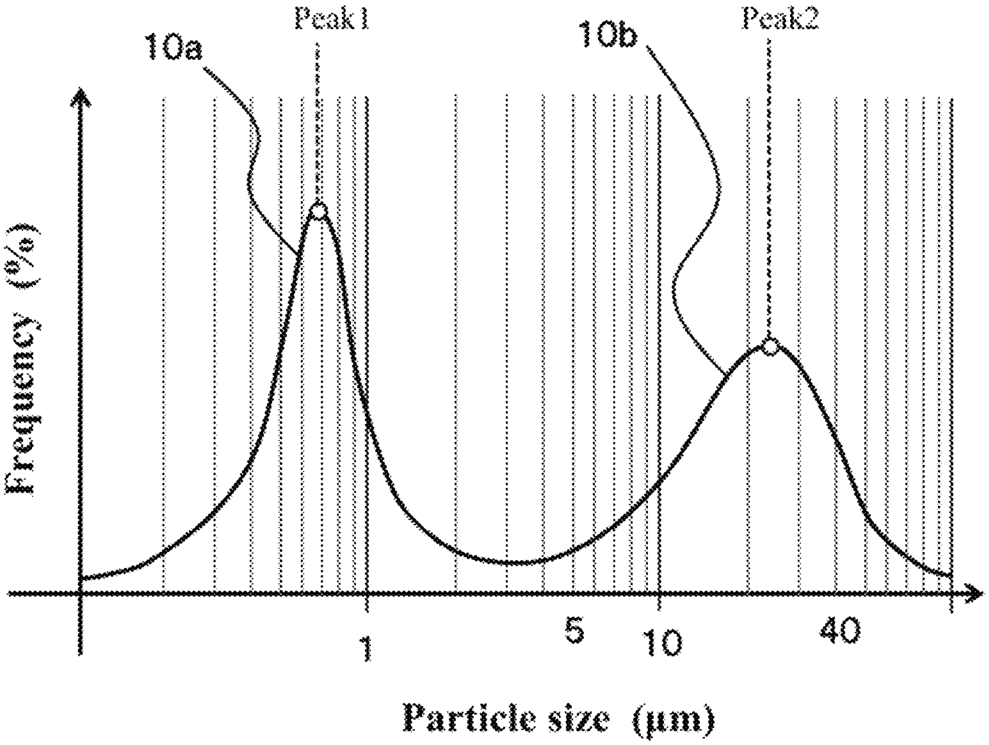
FIG. 2 is a schematic diagram showing an example of particle size distribution of metal magnetic powder contained in the magnetic core of FIG. 1.

The metal magnetic powder 10 preferably contains two or more particle groups having different average particle sizes. The particle group composition of the metal magnetic powder 10 can be recognized by obtaining particle size distribution of the metal magnetic powder 10 based on the Heywood diameter of each soft magnetic metal particle observed in the cross section of the magnetic core 2. For example, a graph shown in FIG. 2 is an example of the particle size distribution of the metal magnetic powder 10. A vertical axis in FIG. 2 is number-based frequency (%), and a horizontal axis in FIG. 2 is a logarithmic axis showing a particle size (μm) in terms of the Heywood diameter.

When the metal magnetic powder 10 is constituted by two particle groups, the particle size distribution of the metal magnetic powder 10 has two peaks as shown in FIG. 2. In the present embodiment, the peak on the smaller particle size side is referred to as a first peak (Peak 1), and the particle group having the first peak is defined as fine powder 10*a*. The peak on the larger particle size side is referred to as a second peak (Peak 2), and the particle group having the second peak is defined as main powder 10*b*. The small particles 11 are contained in the fine powder 10*a*, and the large particles 12 are contained in the main powder 10*b*.

As shown in FIG. 2, when the metal magnetic powder 10 contains the fine powder 10*a* and the main powder 10*b*, a position of the first peak is preferably less than 1 That is, an average value (arithmetic average size) of the Heywood diameters of the fine powder 10*a* is preferably less than 1 and more preferably 0.2 μm or more and less than 1 μm.

A position of the second peak is preferably 5 μm or more and less than 40 That is, an average value (arithmetic average size) of the Heywood diameters of the main powder 10*b* is preferably 5 μm or more and less than 40 μm, and more preferably 10 μm or more and 35 μm or less.

The particle size distribution of the metal magnetic powder 10 and the average value of the Heywood diameters may be calculated by analyzing the cross section of the magnetic core 2 using an electron microscope or the like. For example, a randomly selected cross section of the magnetic core 2 is divided into a plurality of continuous fields of view for observation, and then the Heywood diameter of each soft magnetic metal particle included in each field of view is measured. In this case, it is preferable that an area per field of view is set to an area equivalent to 100 μm×100 μm, and the number of fields of view to be observed is at least 100. It is preferable to measure the Heywood diameters of at least 1000 soft magnetic metal particles.

Even when the metal magnetic powder 10 contains the fine powder 10*a* and the main powder 10*b*, a randomly selected cross section of the magnetic core 2 may be divided into a plurality of continuous fields of view for observation, and then average sizes (average value of the Heywood diameters) of the fine powder 10*a* and the main powder 10*b* may be calculated. When calculating the average size of the fine powder 10*a*, it is preferable that an area per field of view is set to an area equivalent to 10 μm×10 μm, and the number of fields of view to be observed is at least 100. The number of particles constituting the fine powder for measuring the Heywood diameter is preferably at least 1000. When calculating the average size of the main powder 10*b*, it is preferable that an area per field of view is set to an area equivalent to 100 μm×100 μm, and the number of fields of view to be observed is at least 100. The number of particles constituting the main powder for measuring the Heywood diameter is preferably at least 1000.

Note that the metal magnetic powder 10 may be constituted by three particle groups. When the metal magnetic powder 10 contains three particle groups, it is preferable that in the particle size distribution as shown in FIG. 2, a third peak due to medium-size powder exists between the first peak and the second peak. An average value (that is, the third peak) of the Heywood diameters of the medium-size powder can be, for example, 2 μm or more and less than 5 μm.

Each particle constituting the metal magnetic powder 10 is made of soft magnetic metal, and a composition thereof is not particularly limited. For example, each soft magnetic metal particle of the metal magnetic powder 10 can be pure iron, a crystalline alloy, a nanocrystalline alloy, or an amorphous alloy. Examples of the crystalline soft magnetic alloy include a Fe—Ni based alloy, a Fe—Si based alloy, a Fe—Si—Cr based alloy, a Fe—Si—Al based alloy, a Fe—Si—Al—Ni based alloy, a Fe—Ni—Si—Co based alloy, a Fe—Co based alloy, a Fe—Co—V based alloy, a Fe—Co—Si based alloy, and a Fe—Co—Si—Al based alloy. Examples of the nanocrystalline or amorphous soft magnetic alloy include a Fe—Si—B based alloy, a Fe—Si—B—C based alloy, a Fe—Si—B—C—Cr based alloy, a Fe—Nb—B based alloy, a Fe—Nb—B—P based alloy, a Fe—Nb—B—Si based alloy, a Fe—Co—P—C based alloy, a Fe—Co—B based alloy, a Fe—Co—B—Si based alloy, a Fe—Si—B—Nb—Cu based alloy, a Fe—Si—B—Nb—P based alloy, and a Fe—Co—B—P—Si based alloy.

The small particles 11 and the large particles 12 may have the same composition type or different composition types. When the metal magnetic powder 10 is constituted by two particle groups as shown in FIG. 2, the fine powder 10*a* containing the small particles 11 and the main powder 10*b* containing the large particles 12 preferably have different composition types. For example, the main powder 10*b* preferably has a nanocrystalline or amorphous alloy composition from the viewpoint of lowering coercivity. The fine powder 10*a* is preferably pure iron powder such as carbonyl iron powder, or crystalline alloy powder such as Fe—Ni based alloy powder or Fe—Si based alloy powder.

The composition of the metal magnetic powder 10 can be analyzed using, for example, an energy dispersive X-ray analyzer (EDX device) or an electron probe microanalyzer (EPMA) mounted on an electron microscope. When the fine powder 10*a* and the main powder 10*b* have different composition types, the fine powder 10*a* and the main powder 10*b* may be distinguished from each other by area analysis using the EDX device or EPMA.

If detailed composition analysis is difficult with EDX device or EPMA, composition analysis may be performed using a three-dimensional atom probe (3DAP). When 3DAP is used, the composition of the soft magnetic metal particles can be measured by excluding effects of resin components, surface oxidation, and the like in a region to be analyzed. This is because 3DAP can set a small region (for example, a region of Φ20 nm×100 nm) inside the soft magnetic metal particles for measuring an average composition.

A crystal structure of the metal magnetic powder 10 can be analyzed using XRD, electron beam diffraction, or the like. In the present embodiment, the term "amorphous" means that an amorphous degree X is 85% or more, or that electron beam diffraction shows no diffraction spots caused by crystals. The amorphous crystalline structure includes structure mostly comprised of amorphous, heteroamorphous structure, and the like. In the case of a heteroamorphous structure, an average grain size of crystals present in the amorphous is preferably 0.1 nm or more and 10 nm or less. In the present embodiment, the term "nanocrystal" means a structure having an amorphous degree X of less than 85% and an average crystal grain size of 100 nm or less (preferably 3 nm to 50 nm), and the term "crystalline" means a structure having an amorphous degree X of less than 85% and an average crystal grain size exceeding 100 nm.

In the metal magnetic powder 10, it is preferable that an insulating coating is formed so as to cover a particle surface. The insulating coating may be formed on each of the soft magnetic metal particles that constitute the metal magnetic powder 10, or the metal magnetic powder 10 may contain soft magnetic metal particles having the insulating coating and soft magnetic metal particles not having the insulating coating. When the metal magnetic powder 10 is constituted by two particle groups as shown in FIG. 2, it is particularly preferable that the insulating coating is formed on the surface of each large particle 12 contained in the main powder 10*b*. Each of the small particles 11 contained in the fine powder 10*a* may also has an insulating coating so as to cover the particle surface.

The insulating coating can be a film (oxide film) generated by oxidation of the particle surface, or a coating containing an inorganic material such as BN, $SiO_2$, MgO, $Al_2O_3$, phosphates, silicates, borosilicates, bismuthates, or various glasses, and a material of the insulating coating is not particularly limited. The insulating coating may have a structure in which two or more types of coatings are laminated. An average thickness of the insulating coating is preferably 1 nm or more and 200 nm or less, and more preferably 50 nm or less.

The resin 20 functions as an insulating binder that fixes the metal magnetic powder 10 in a predetermined dispersed state. The resin 20 preferably contains a thermosetting resin such as an epoxy resin.

The magnetic core 2 preferably contains a modifier for suppressing contact between the soft magnetic metal particles. Polymer materials such as polyethylene glycol (PEG), polypropylene glycol (PPG), and polycaprolactone (PCL) can be used as the modifier. Particularly, the modifier is preferably a polymer having a polycaprolactone structure. Examples of the polymer having a polycaprolactone structure include, for example, raw materials for urethane such as polycaprolactone diol and polycaprolactone tetraol, and some polymers belonging to polyesters. A content of the modifier is preferably 0.025 wt % or more and 0.500 wt % or less with respect to a total amount of the magnetic core 2. It is considered that the above-described modifier is adsorbed so as to coat the surfaces of the soft magnetic metal particles.

As shown in FIG. 1, the small particles 11 and the large particles 12 are dispersed in the resin 20 and the small particles 11 are filled between the large particles 12. In the magnetic core 2 of the present embodiment, a distance between the small particles 11 and a distance between the small particle 11 and the large particle 12 are controlled so as to satisfy predetermined requirements. A dispersed state of the small particles 11 and the large particles 12 is described in detail below.

Figure 3A:
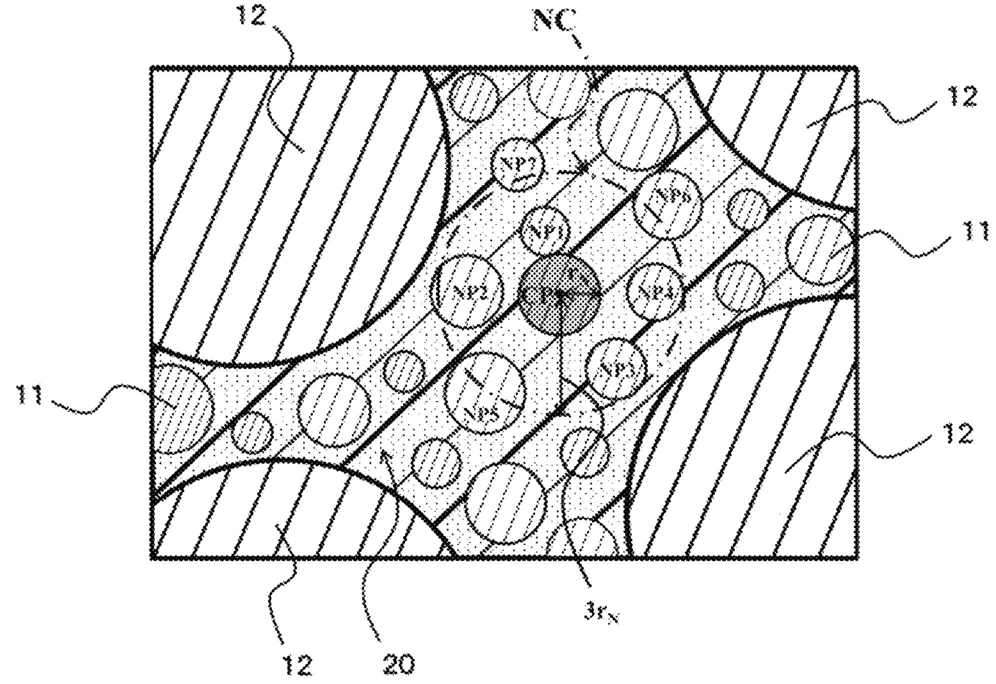
FIG. 3A is a schematic diagram showing a cross section analysis method of the magnetic core.

First, a method for analyzing the dispersed state of the small particles 11 is described with reference to FIGS. 3A and 3B. In a cross section of the magnetic core 2 as shown in FIG. 3A, a small particle CP (the small particle 11 shown in gray in FIG. 3A) is randomly selected from the small particles 11 existing within a field of view for observation. The Heywood diameter of the small particle CP is measured, and ½ of the Heywood diameter is assumed as a radius $r_N$ of the small particle CP. Furthermore, a circle with a radius of $3\times r_N$ from a centroid of the small particle CP is drawn, and a region within the circle is defined as a neighborhood region NC of the small particle CP.

Next, other small particles 11 existing in the neighborhood region NC of the small particle CP are specified. Here, the specified other small particles 11 are referred to as neighborhood particles NP. The neighborhood particles NP present in the neighborhood region NC include the small particle 11 whose entire circumference is within the neighborhood region NC and the small particle 11 partially present in the neighborhood region NC (that is, the small particle 11 present extending from inside of the neighborhood region NC to outside of the neighborhood region NC). For example, in the schematic cross-sectional view shown in FIG. 3A, seven small particles 11, NP1 to NP7, are present in the neighborhood region NC of the small particle CP.

Figure 3B:
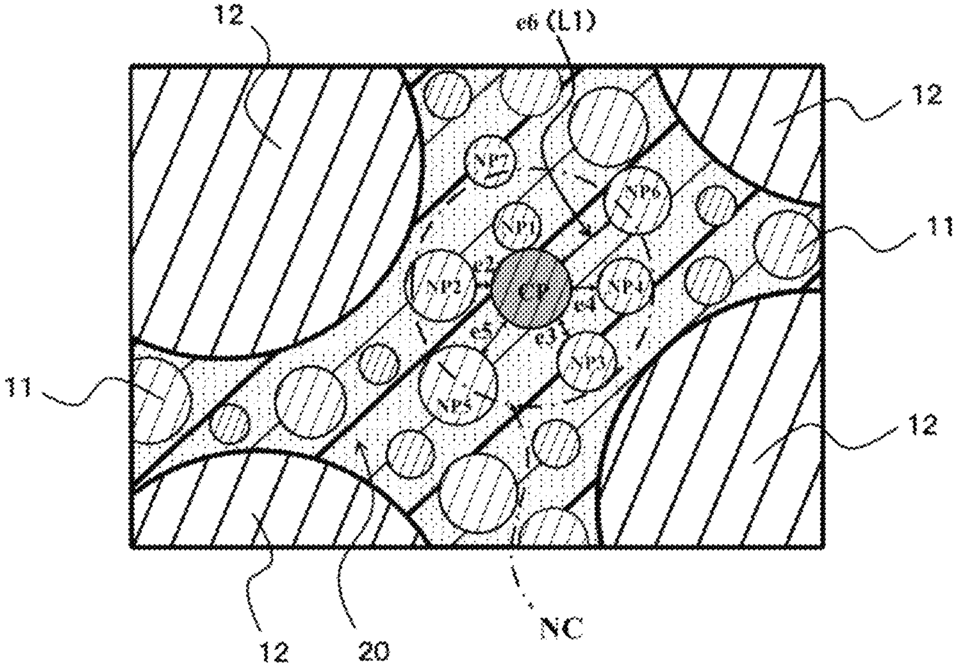
FIG. 3B is a schematic diagram showing a cross section analysis method of the magnetic core.

After specifying the neighborhood region NC and the neighborhood particles NP (NP1 to NP7), edge-to-edge distances between the small particle CP and each of the neighborhood particles NP are measured as shown in FIG. 3B. The edge-to-edge distance is a distance from an outermost surface of the small particle CP to an outermost surface of the neighborhood particle NP adjacent to the small particle CP. For example, a straight line connecting the centroid of the small particle CP and a centroid of the neighborhood particle NP2 is drawn, and a distance from the outermost surface of the small particle CP to an outermost surface of the neighborhood particle NP2 on the straight line may be assumed as an edge-to-edge distance e2 between the small particle CP and the neighborhood particle NP2. An outermost surface of the neighborhood particle NP1 is in direct contact with the outermost surface of the small particle CP, and an edge-to-edge distance e1 between the small particle CP and the neighborhood particle NP1 is 0 μm.

Note that in FIG. 3B, the neighborhood particles NP adjacent to the small particle CP refer to the neighborhood particle NP1 that is in direct contact with the small particle CP, and the neighborhood particles NP2 to NP6 that are adjacent to the small particle CP through the resin 20. When another neighborhood particle NP is interposed between the small particle CP and the predetermined neighborhood particle NP, the predetermined neighborhood particle NP does not correspond to the "neighborhood particle NP adjacent to the small particle CP". For example, as shown in FIG. 3B, another neighborhood particle NP1 is interposed on a straight line connecting the centroid of the neighborhood particle NP7 and the centroid of the small particle CP. Therefore, the neighborhood particle NP7 does not correspond to the "neighborhood particle NP adjacent to the small particle CP", and the neighborhood particle NP7 is excluded from measurement of the edge-to-edge distance.

The edge-to-edge distances e1 to e6 between the small particle CP and the neighborhood particles NP1 to NP6 are measured in the manner described above, and the longest edge-to-edge distance among the edge-to-edge distances e1 to e6 is defined as L1. That is, the edge-to-edge distance between the small particle CP positioned at a center of the neighborhood region NC and the neighborhood particle NP farthest from the center is defined as L1. For example, in FIG. 3B, the edge-to-edge distance e6 between the small particle CP and the neighborhood particle NP6 corresponds to L1.

The above analysis is performed on at least 1000 small particles 11. That is, at least 1000 small particles 11 are randomly selected as the small particles CP, and L1 is measured for each small particle CP. An average value of L1 is defined as L1av, and an average value (arithmetic average size) of the Heywood diameters of the small particles 11 is defined as dav.

In the magnetic core 2 of the present embodiment, a ratio of L1av to day satisfies $5 \leq ((L1av/dav) \times 100) \leq 70$, preferably satisfies $15.5 \leq ((L1av/dav) \times 100) \leq 69.5$, and more preferably satisfies $16.5 \leq ((L1av/dav) \times 100) \leq 50$. L1av is preferably 0.030 μm or more and less than 0.450 μm, and more preferably 0.100 μm or more and 0.400 μm or less.

Figure 3C:
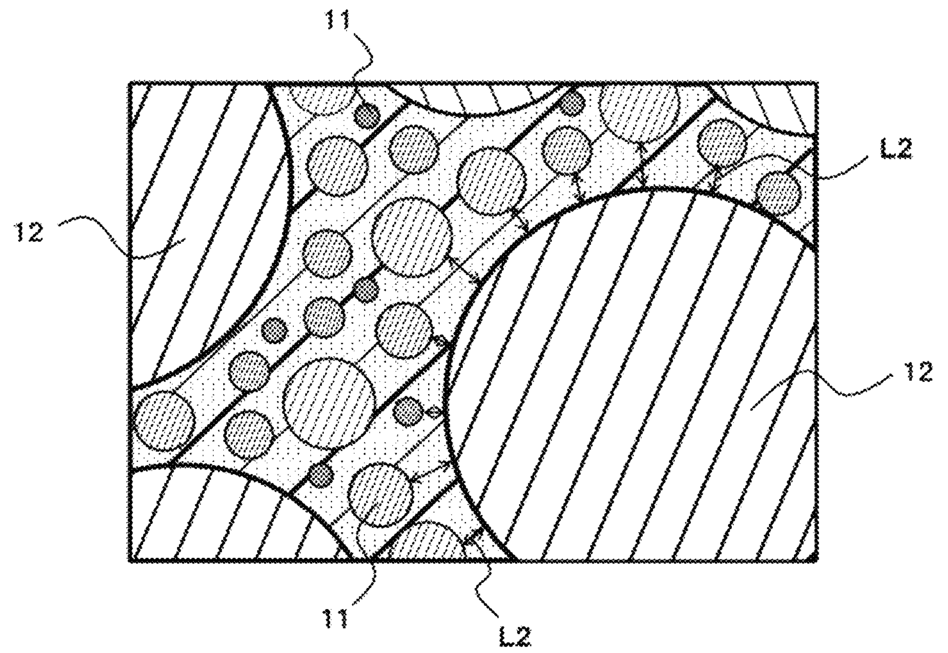
FIG. 3C is a schematic diagram showing a cross section analysis method of the magnetic core.

As shown in FIG. 3C, edge-to-edge distances between the small particle 11 and the large particle 12 are measured. Specifically, in the cross section of the magnetic core 2, a large particle 12 to be measured is randomly selected from the large particles 12 existing within the field of view for observation. Then, the small particles 11 existing around the randomly selected large particle 12 and adjacent to the randomly selected large particle 12 are specified. Here, "adjacent" means to be in direct contact with the randomly selected large particle 12 or to be adjacent to the randomly selected large particle 12 through the resin 20. When another particle is interposed on the straight line connecting a centroid of the predetermined small particle 11 and a centroid of the randomly selected large particle, the predetermined small particle 11 does not correspond to the "small particle 11 adjacent to the random large particle 12" and is excluded from measurement of the edge-to-edge distance.

An edge-to-edge distance L2 between the randomly selected large particle 12 and each small particle 11 adjacent to the randomly selected large particle 12 is measured. More specifically, a straight line connecting the centroid of the randomly selected large particle 12 and the centroid of the small particle 11 is drawn, and a distance from an outermost surface of the randomly selected large particle 12 to an outermost surface of the small particle 11 on the straight line is defined as the edge-to-edge distance L2. When the randomly selected large particle 12 is in direct contact with the adjacent small particle 11, L2=0 The above analysis is performed on at least 100 large particles 12, and at least 1000 small particles 11 adjacent to the large particle 12 to be measured are specified (that is, the n number of L2 is at least 1000), and average value and standard deviation of L2 are calculated. The average value of L2 is defined as L2av, and the standard deviation of L2 is defined as σ.

In the magnetic core 2 of the present embodiment, L2av is 0.02 μm or more and 0.13 μm or less, preferably 0.03 μm or more and 0.12 μm or less, and more preferably 0.04 μm or more and 0.10 μm or less. The standard deviation σ of L2 is 0.25 μm or less, preferably 0.20 μm or less, and more preferably 0.10 μm or less.

Figure 4:
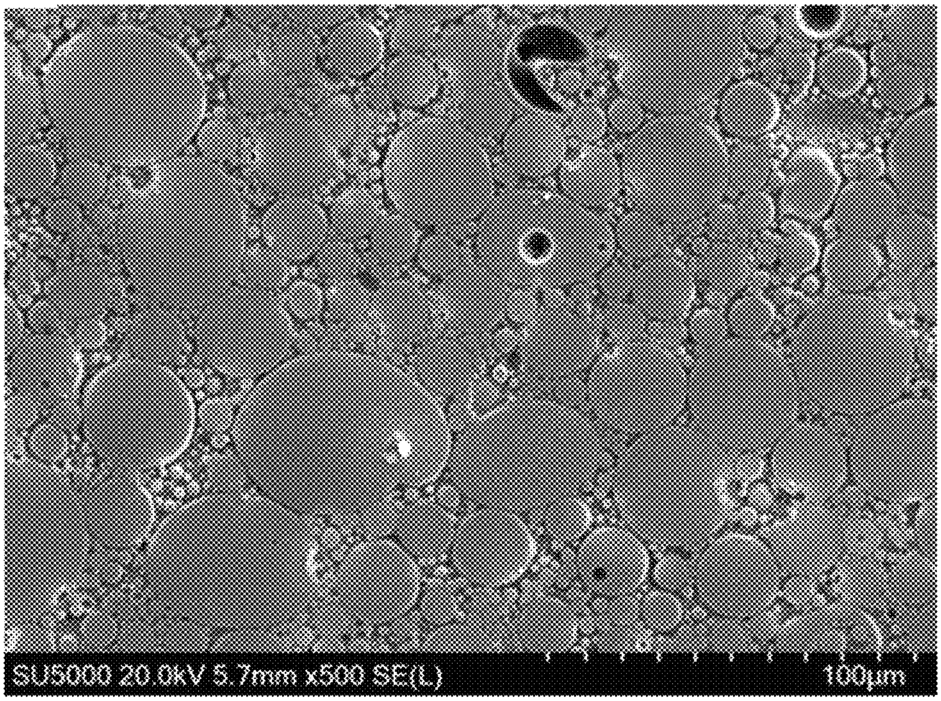
FIG. 4 is an example of an SEM image showing a cross section of the magnetic core according to the present disclosure.

As described above, by controlling L1av/dav, L2av, and the standard deviation σ of L2 within the predetermined ranges described above, both improvement of a withstand voltage and improvement of DC bias characteristics can be achieved. Actually, an SEM image shown in FIG. 4 is an example of a magnetic core in which L1av/dav, L2av, and standard deviation σ of L2 are each controlled within the predetermined range.

In the cross section of the magnetic core 2, an area occupied by the small particles 11 is defined as S1, and an area occupied by the large particles 12 is defined as S2. In the magnetic core 2 of the present embodiment, a ratio of 51 to S2 (S1/S2) is preferably 0.2 or more and 0.5 or less. By satisfying $0.2 \leq (S1/S2) \leq 0.5$, the withstand voltage and DC bias characteristics can be further improved. Note that S1/S2 may be measured by the same method as A1/A2. When the metal magnetic powder 10 contains the fine powder 10*a* and the main powder 10*b*, it is preferable to set contents of the fine powder 10*a* and the main powder 10*b* so as to satisfy the above S1/S2.

The average roundness of the large particles 12 in the cross section of the magnetic core 2 is preferably 0.80 or more, more preferably 0.90 or more, and still more preferably 0.95 or more. The higher the average roundness of the large particles 12, the more improved the withstand voltage and DC bias characteristics. Note that a roundness of each large particle 12 is represented by $2(\pi S)^{1/2}/L$, in which S is an area of each large particle 12 in the cross section of the magnetic core 2, and L is a circumferential length of each large particle 12. A roundness of a perfect circle is 1, and the closer the roundness is to 1, the higher a sphericity of the particle. The average roundness of the large particles 12 is preferably calculated by measuring the roundness of at least 100 large particles 12.

Note that an average roundness of the small particles 11 is not particularly limited, and it is preferable that the small particles 11 have a high average roundness as the large particles 12. Specifically, the average roundness of the small particles 11 is preferably 0.80 or more.

An example of a method for manufacturing the magnetic core 2 according to the present embodiment is described below.

First, raw material powder of the metal magnetic powder 10 is produced. A method for producing the raw material powder is not particularly limited. For example, the raw material powder may be produced by an atomizing method such as a water atomizing method or a gas atomizing method. Alternatively, the raw material powder may be produced by a synthesis method such as a CVD method using at least one of metal salt evaporation, reduction, and thermal decomposition. The raw material powder may be produced by using an electrolysis method or a carbonyl method, or may be produced by pulverizing a ribbon-shaped or thin plate-shaped starting alloy. Among the above production methods, it is particularly preferable to select the atomizing method.

When the small particles 11 and the large particles 12 have the same composition type, a raw material powder having a wide particle size distribution is produced, and a raw material powder containing the small particles 11 and a raw material powder containing the large particles 12 may be obtained by classifying the raw material powder. Alternatively, as the raw material powder of the metal magnetic powder 10, it is preferable to produce a raw material powder for fine powder containing the small particles 11 and a raw material powder for main powder containing the large particles 12. The arithmetic average size of the raw material powder for fine powder is preferably less than 1 μm. The arithmetic average size of the raw material powder for main powder is preferably 5 μm or more and less than 40 μm, D10 of the raw material powder for main powder is preferably 2 μm or more, and D90 of the raw material powder for main powder is preferably 80 μm or less. The particle sizes of the raw material powder for fine powder and the raw material powder for main powder may be adjusted by powder production conditions and various classification methods.

When the insulating coating is to be formed on the particle surface of the metal magnetic powder 10, the raw material powder is subjected to coating forming treatments such as heat treatment, phosphate treatment, mechanical alloying, silane coupling treatment, or hydrothermal synthesis.

A method for manufacturing the magnetic core 2 using the raw material powder for fine powder and the raw material powder for main powder is described below. First, the raw material powder for the metal magnetic powder and a resin raw material are kneaded to obtain a resin compound. Generally, when adding two or more types of metal magnetic powder to the magnetic core, two or more types of raw material powders and the resin raw material and the like are mixed and kneaded at once. In the present embodiment, the kneading step is performed in two stages in order to control each parameter of L1av/dav, L2av, and σ within the predetermined range.

Specifically, in a primary kneading in a first stage, the raw material powder for fine powder having a small particle size, a first resin raw material, and a first solvent are kneaded to obtain a primary resin compound. A thermosetting resin such as an epoxy resin may be used as the first resin raw material, and various organic solvents such as acetone, methyl ethyl ketone (MEK), and butyl carbitol acetate (BCA) may be used as the first solvent. In a secondary kneading in a second stage, the primary resin compound, the raw material powder for main powder having a large particle size, the second resin raw material, and a second solvent are kneaded to obtain a secondary resin compound. As described above, in the two-stage kneading step, it is preferable that the raw material powder for fine powder is kneaded first, and then the secondary kneading is performed by adding the raw material powder for main powder to the primary resin compound containing the raw material powder for fine powder.

In the two-stage kneading step, a magnetic powder concentration during the primary kneading is set lower than a magnetic powder concentration during the secondary kneading. Here, the magnetic powder concentration (wt %) during the primary kneading is represented by "(weight of raw material powder for fine powder)/(total weight of raw material powder for fine powder, first resin raw material, and first solvent)×100". The magnetic powder concentration (wt %) during the secondary kneading is represented by "(total weight of raw material powder for main powder and raw material powder for fine powder in primary resin compound)/(total weight of primary resin compound, raw material powder for main powder, second resin raw material, and second solvent)×100". The magnetic powder concentration during the primary kneading is preferably 65 wt % to 75 wt %. The magnetic powder concentration during the secondary kneading is preferably 5 wt % to 20 wt % higher than the magnetic powder concentration during the primary kneading, and is preferably 70 wt % to 90 wt %.

A compound ratio of the resin in the primary resin compound is represented by a weight ratio of the first resin raw material to 100 parts by weight of the raw material powder for fine powder, and the compound ratio of the resin in the primary resin compound is preferably 1 part by weight to 5 parts by weight. A compound ratio of the primary resin compound in the secondary kneading may be set so that S1/S2 in the magnetic core 2 is within a desired range. A compound ratio of the resin in the secondary resin compound is represented by a weight ratio of resin (a total weight of the second resin raw material and the first resin raw material in the first resin compound) with respect to 100 parts by weight of magnetic powder (a total weight of the raw material powder for main powder and the raw material powder for fine powder in the primary resin compound), and the compound ratio of the resin in the secondary resin compound is preferably 1 part by weight to 5 parts by weight.

It is preferable to add the modifier in the kneading step. The modifier may be added during the secondary kneading, but is preferably added during both the primary kneading and the secondary kneading. An adding amount of the modifier is preferably controlled so that a content of the modifier with respect to a total amount of the magnetic core 2 is 0.025 wt % or more and 0.500 wt % or less. In the kneading step, a preservative, a hardening accelerator, and the like may be added in addition to the modifier.

Both the primary kneading and the secondary kneading may be performed using various kneading machines such as a kneader, a planetary mixer, a rotating and revolving mixer, and a twin-screw extruder. For example, when the kneading is performed using a rotating and revolving mixer, the obtained secondary resin compound may be dried under a temperature of 60° C. to 80° C. for 1 to 24 hours, and processed into granules having a size of approximately 50 μm to 350 μm.

Next, the granules (secondary resin compound) obtained above are filled in a mold and then compression molded to obtain a molded body. A molding pressure in this case may be, for example, 100 MPa to 800 MPa. Note that the packing rate of the metal magnetic powder and A1/A2 in the magnetic core 2 may be controlled by the content of resin, and may also be controlled by a molding pressure. The molded body is held at 100° C. to 200° C. for 1 hour to 5 hours to harden the thermosetting resin. The magnetic core 2 is obtained by the above steps.

The magnetic core 2 according to the present embodiment can be applied to various magnetic components such as inductors, transformers, and choke coils. For example, a magnetic component 100 shown in FIG. 5 is an example of a magnetic component including the magnetic core 2.

Figure 5:
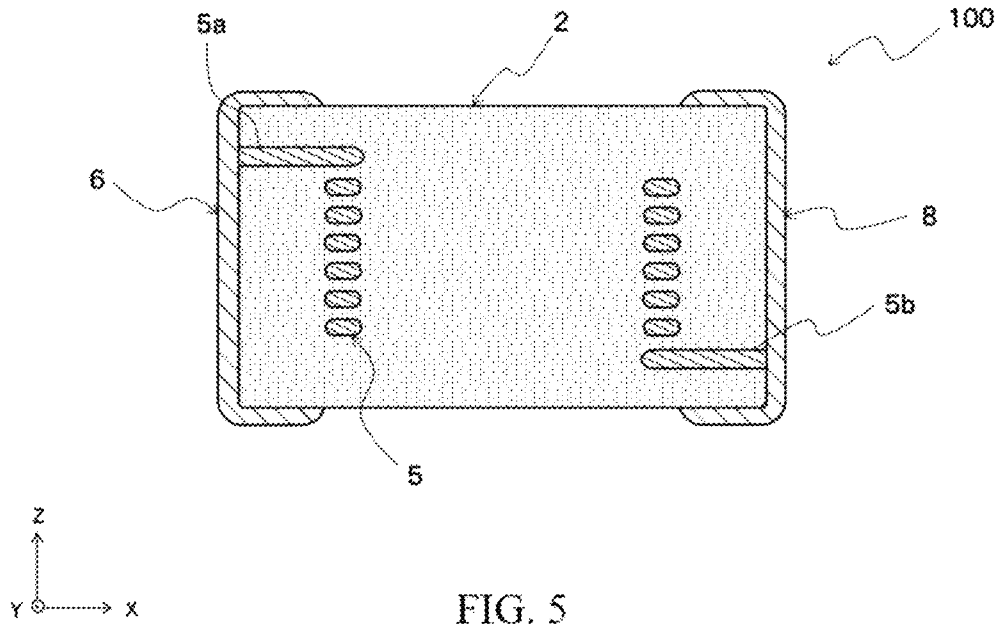
FIG. 5 is a cross-sectional view showing an example of a magnetic component according to the present disclosure.

In the magnetic component 100 shown in FIG. 5, an element body is constituted by the magnetic core 2 as shown in FIG. 1. A coil 5 is embedded in the magnetic core 2 as the element body, and end portions 5*a* and 5*b* of the coil 5 are drawn out to end surfaces of the magnetic core 2, respectively. A pair of external electrodes 6 and 8 are formed on the end surfaces of the magnetic core 2, and the pair of external electrodes 6 and 8 are electrically connected to the end portions 5*a* and 5*b* of the coil 5, respectively. Note that when the coil 5 is embedded inside the magnetic core 2 as in the magnetic component 100, various parameters such as A1/A2, S1/S2, and the edge-to-edge distances are analyzed in field of views in which the coil 5 is not reflected.

The application of the magnetic component 100 shown in FIG. 5 is not particularly limited, and is suitable to, for example, a power inductor used in a power supply circuit. Note that the magnetic component including the magnetic core 2 is not limited to the aspect shown in FIG. 5, and may be a magnetic component in which a wire is wound by a predetermined number of turns on a surface of the magnetic core 2 having a predetermined shape.

SUMMARY OF EMBODIMENT

According to the present embodiment, the magnetic core 2 includes the metal magnetic powder 10 and the resin 20, and A1/A2, which corresponds to the packing rate of the metal magnetic powder 10, is 60% or more and 90% or less. The magnetic core 2 satisfies that $5 \leq ((L1av/dav) \times 100) \leq 70$, $0.02\ \mu m \leq L2av \leq 0.13\ \mu m$, and $\sigma \leq 0.25\ \mu m$.

Since the magnetic core 2 has the above features, it is possible to improve both the withstand voltage and the DC bias characteristics while maintaining a high relative magnetic permeability.

The average roundness of the large particles 12 contained in the magnetic core 2 is 0.80 or more. By increasing the average roundness of the large particles 12, the withstand voltage and DC bias characteristics can be further improved.

In the cross section of the magnetic core 2, the ratio (S1/S2) of the area S1 of the small particles 11 to the area S2 of the large particles 12 is 0.2 or more and 0.5 or less. By setting abundance ratios of the small particles 11 and the large particles 12 within the above ranges, the withstand voltage and the DC bias characteristics can be further improved.

Although the embodiment of the present disclosure has been described above, the present disclosure is not limited to the above-described embodiment, and can be variously modified within the scope of the present disclosure.

EXAMPLES

Hereinafter, the present disclosure is described in further detail based on specific examples. However, the present disclosure is not limited to the following examples.

Experiment 1

First, raw material powder for fine powder containing the small particles 11 and raw material powder for main powder containing the large particles 12 were prepared. The raw material powder for fine powder was powder made of crystalline pure iron, and an average particle size of the raw material powder for fine powder was 0.60 μm. The raw material powder for main powder was powder made of an amorphous Fe—Si—B based alloy produced by a high pressure gas atomization method, and an average particle size of the raw material powder for main powder was 25 Note that the average particle size of each raw material powder described above is an arithmetic average of circle equivalent diameters calculated from projected areas of each particle, and was calculated using an image analyzer.

The raw material powder for fine powder and the raw material powder for main powder were each subjected to a coating treatment. An insulating coating containing a phosphoric acid-based oxide was formed on each particle surface of the raw material powder for fine powder, and an average thickness of the insulating coatings was 10 nm. An insulating coating containing a borosilicate-based, Bi-based, and phosphoric acid-based composite oxide was formed on each particle surface of the raw material powder for main powder, and an average thickness of the insulating coatings was 20 nm.

In Experiment 1, using the raw material powder for fine powder and the raw material powder for main powder, a kneading step was performed under 12 types of Conditions A to L shown in Table 1, so that granules according to Sample 1 to Sample 12 were obtained.

Under Condition A, the raw material powder for fine powder, the raw material powder for main powder, an epoxy resin, and BCA (solvent) were mixed together and then kneaded at once. Under Conditions B to L, kneading was performed in two stages. Under each of Conditions B to L, the raw material powder shown in Table 1, epoxy resin (first resin), and BCA (first solvent) were kneaded in the primary kneading, and the primary resin compound, the raw material powder shown in Table 1, epoxy resin (second resin), BCA (second solvent) were kneaded in the secondary kneading. Under each of Conditions B to L, the magnetic powder concentration in the primary kneading and the magnetic powder concentration in the secondary kneading were set to values shown in Table 1.

Under each of Conditions A to L, adding amounts of the raw material powders and/or the primary resin compound were set so that a weight ratio of the fine powder to the main powder satisfies “finepowder:mainpowder=2:8”. Under each of Conditions A to L, an adding amount of the resin was set so that a content of the resin contained in the granules was 2.5 parts by weight with respect to 100 parts by weight of the magnetic powder. Note that under each of Conditions A to L of Experiment 1, no modifier was added. In the kneading step described above, a rotating and revolving mixer was used, and a rotation speed, a revolution speed, and a stirring time were uniformly set for each condition.

In each sample of Experiment 1, the granules obtained in the above kneading step were filled in a mold and pressed to obtain a toroidal molded body. In this case, the molding pressure was controlled so that a relative magnetic permeability μi (a relative magnetic permeability in a state where no DC magnetic field is applied (0 kA/m)) of the obtained magnetic core was within a range of 40±0.5 (no units). Then, the molded body is heat-treated at 180° C. for 60 minutes to harden the epoxy resin in the molded body, so that a magnetic core having a toroidal shape (outer diameter: 11 mm, inner diameter: 6.5 mm, thickness: 1 mm) was obtained.

In each sample of Experiment 1, the following evaluation was performed on the produced magnetic core.

(Cross-Section Analysis of Magnetic Core)

A cross-section of the magnetic core of each sample was observed with an SEM, and L1av/dav×100 (no units), L2av (μm), and σ (μm) were measured by the methods described in the embodiment. Note that when the particle size distribution, in terms of the Heywood diameter, of the metal magnetic powder contained in the cross section of the magnetic core was obtained during cross section analysis, in this experiment, the average of the Heywood diameters of the fine powder and the main powder observed in the cross section both roughly coincided with the average size of the raw material powder.

(Evaluation of Withstand Voltage Characteristics)

In the evaluation of withstand voltage characteristics, a columnar magnetic core was obtained by the same method as the toroidal magnetic core described above. In—Ga electrodes are formed at both end portions of the magnetic core, and a voltage was applied to both end portions of the magnetic core using a boost breakdown tester (THK-2011ADMPT manufactured by Tama Densoku Co., Ltd.). The withstand voltage (unit: V/mm) was calculated from a voltage value when a current of 1 mA flows and a length L of the magnetic core.

In Experiment 1, the withstand voltage of Sample 1 was used as a reference, and an extent to which the withstand voltage of each of Samples 2 to 12 was improved relative to the reference was evaluated. That is, the withstand voltage of Sample 1 was defined as $V_{Ref}$, and the withstand voltage of each of Samples 2 to 12 was defined as $V_N$, so that an improvement rate of the withstand voltage $V_N/V_{Ref}$ was calculated. A sample whose withstand voltage improvement rate was less than 1.1 times was judged as "F (failed)", a sample of 1.1 times or more and less than 1.3 times was judged as "G (good)", a sample of 1.3 times or more and less than 1.5 times was judged as "VG (very good)", and a sample of 1.5 times or more was judged as "Ex (extremely good)".

(Evaluation of DC Bias Characteristics)

In the evaluation of the DC bias characteristics, first, a polyurethane coated copper wire (UEW wire) was wound around the toroidal magnetic core of each sample. Then, a DC current was applied stepwise from 0 A to the magnetic core. A current value Isat (unit: A) was measured when the inductance decreased by 10% when the DC current was applied to the inductance when the DC current was 0 A. It can be determined that the higher the value of Isat, the better the DC bias characteristics.

In the evaluation of the DC bias characteristics, Isat of Sample 1 was used as a reference, and an extent to which Isat of each of Samples 2 to 12 was improved relative to the reference was evaluated. That is, Isat of Sample 1 was defined as $I_{Ref}$, and Isat of each of Samples 2 to 12 was defined as $I_N$, so that "$I_N - I_{Ref}$" (unit: A) was calculated. A sample that satisfies $(I_N - I_{Ref}) \leq 0$ A was judged as "F (failed)", a sample that satisfies 0 A$<(I_N - I_{Ref})<$0.5 A was judged as "G (good)", a sample that satisfies 0.5 A$\leq(I_N - I_{Ref})<$1.0 A was judged as "VG (very good)", and a sample that satisfies 1.0 A$\leq(I_N - I_{Ref})$ was judged as "Ex (extremely good)".

Table 1 shows evaluation results for each sample in Experiment 1.

TABLE 1

| | | Production condition (kneading condition) | | | | | | | | | Core | |
|---|---|---|---|---|---|---|---|---|---|---|---|---|
| | | | Primary kneading | | Secondary kneading | | Cross section analysis | | | | characteristics | |
| Sample No. | Example/ Comparative Example | Kneading condition No. | Primary raw materail powder | Magnetic powder concentration | Added raw materail powder | Magnetic powder concentration | L1av (μm) | (L1av/ dav) × 100 | L2av (μm) | σ (μm) | With-stand voltage | Isat |
| 1 | Comp. Ex | Condition A | Fine powder + Main powder | 85 wt % | — | — | 0.021 | 3.5 | 0.128 | 0.23 | Refer-ence | Refer-ence |
| 2 | Comp. Ex | Condition B | Fine powder | 85 wt % | Main powder | 80 wt % | 0.022 | 3.7 | 0.127 | 0.23 | F | F |
| 3 | Comp. Ex | Condition C | Fine powder | 80 wt % | Main powder | 80 wt % | 0.018 | 3.1 | 0.125 | 0.21 | F | F |
| 4 | Example | Condition D | Fine powder | 75 wt % | Main powder | 80 wt % | 0.410 | 69.5 | 0.125 | 0.23 | G | G |
| 5 | Example | Condition E | Fine powder | 70 wt % | Main powder | 80 wt % | 0.380 | 64.4 | 0.120 | 0.21 | G | G |
| 6 | Example | Condition F | Fine powder | 65 wt % | Main powder | 80 wt % | 0.400 | 67.8 | 0.124 | 0.21 | G | G |
| 7 | Comp. Ex | Condition G | Fine powder | 60 wt % | Main powder | 80 wt % | 0.410 | 69.5 | 0.135 | 0.27 | F | F |
| 8 | Comp. Ex | Condition H | Fine powder | 70 wt % | Main powder | 70 wt % | 0.402 | 68.1 | 0.137 | 0.24 | F | F |
| 9 | Comp. Ex | Condition I | Main powder | 80 wt % | Fine powder | 80 wt % | 0.399 | 67.6 | 0.125 | 0.28 | F | F |
| 10 | Comp. Ex | Condition J | Main powder | 70 wt % | Fine powder | 80 wt % | 0.385 | 65.3 | 0.134 | 0.24 | F | F |
| 11 | Example | Condition K | Fine powder | 70 wt % | Main powder | 90 wt % | 0.370 | 62.7 | 0.125 | 0.23 | G | G |
| 12 | Comp. Ex | Condition L | Fine powder | 70 wt % | Main powder | 95 wt % | 0.375 | 63.6 | 0.141 | 0.29 | F | F |

As shown in Table 1, in Sample 1, in which the fine powder and the main powder were kneaded at once by a manufacturing method in the related art, the small particles 11 easily aggregated, and ((L1av/dav)×100) was less than 5. In Sample 4 to Sample 6 and Sample 11 among the samples in which the two-stage kneading step was performed, magnetic cores satisfying 5≤((L1av/dav)×100)≤70, 0.02 μm≤L2av≤0.13 μm, and σ≤0.25 μm were obtained. In Sample 4 to Sample 6 and Sample 11, in which L1av/dav, L2av, and σ satisfy the predetermined requirements, both the withstand voltage and the DC bias characteristics could be improved.

From the results of Experiment 1, it was found that the two-stage kneading step is preferable in order to control L1av/dav, L2av, and σ within the predetermined ranges. It was also found that in the two-stage kneading step, the fine powder with a fine particle size is particularly preferably added in the primary kneading, and the magnetic powder concentration in the primary kneading is particularly preferably set lower than the magnetic powder concentration in the secondary kneading while controlling the magnetic powder concentration in each stage within an appropriate range.

Experiment 2

In Experiment 2, magnetic cores of Sample A1 to Sample A12, Sample E1 to Sample E15, and Sample M1 to Sample M22 were manufactured using a predetermined modifier.

Sample A1 to Sample A12

Sample A1 to Sample A12 all correspond to Comparative Examples, and granules were obtained by the one-stage kneading in the related art. Specifically, a kneading condition for Sample A1 was the same as Condition A of Experiment 1, and the raw material powder for fine powder, raw material powder for main powder, epoxy resin, and BCA were mixed and kneaded at once. Sample A2 to Sample A12 were also kneaded under Condition A in the same manner as Sample A1, and in this case, polypropylene glycol (PPG) was added as the modifier. An adding amount of the modifier in each sample was set so that a content (wt %) of the modifier with respect to a total amount of the magnetic core becomes a value shown in Table 2.

In each of Sample A1 to Sample A12, crystalline pure iron powder was used as the raw material powder for fine powder, and an average particle size of the raw material powder for fine powder was 0.59 Amorphous Fe—Si—B-based alloy powder was used as the raw material powder for main powder, and an average particle size of the raw material powder for main powder was 25 The insulating coatings having the same material and average thickness as in Experiment 1 were formed on these raw material powders. Furthermore, a weight ratio of the fine powder to the main powder was the same for each of Sample A1 to Sample A12, and was set so as to satisfy "fine powder:main powder=3:7". A content of the epoxy resin was the same for each of Sample A1 to Sample A12, and was 2.00 parts by weight with respect to 100 parts by weight of the magnetic powder.

Magnetic cores of Sample A1 to Sample A12 were obtained under the same experiment condition as in Experiment 1 except for the above.

Sample E1 to Sample E15

Sample E1 to Sample E15 were all subjected to the two-stage kneading under Condition E shown in Table 1 of Experiment 1. In Sample E2 to Sample E15, PPG was added as the modifier during kneading under Condition E. The modifier is added in both the primary kneading and the secondary kneading, and the adding amount of the modifier was set so that a content (wt %) of the modifier with respect to the total amount of the magnetic core becomes the value shown in Table 3.

In each of Sample E1 to Sample E15, the raw material powder for fine powder is the crystalline pure iron powder, the raw material powder for main powder is the amorphous Fe—Si—B-based alloy powder, and a weight ratio of the fine powder to the main powder was set to satisfy "finepowder:mainpowder=3:7". The insulating coatings having the same material and average thickness as in Experiment 1 were also formed on the raw material powders of each of Sample E1 to Sample E15. The average particle size of the raw material powder for fine powder, the average particle size of the raw material powder for main powder, and the content of the resin contained in the granules after the secondary kneading were as shown in Table 3. Magnetic cores of Sample E1 to Sample E15 were obtained under the same experiment condition as in Experiment 1 except for the above.

Sample M1 to Sample M11

In Sample M1 to Sample M11, polycaprolactone (PCL) was added as the modifier. In Sample M1, the modifier was added in the one-stage kneading step under Condition A, and in Sample M2 to Sample M11, in the two-stage kneading step under Condition E, the above modifier was added in both the primary kneading and the secondary kneading. An adding amount of the modifier in each sample was set so that a content (wt %) of the modifier with respect to a total amount of the magnetic core becomes a value shown in Table 4.

In each of Sample M1 to Sample M11, the raw material powder for fine powder is the crystalline pure iron powder having the average particle size of 0.59 μm, and the raw material powder for main powder is the amorphous Fe—Si—B-based alloy powder having the average particle size of 25 μm. The insulating coatings having the same material and average thickness as in Experiment 1 were formed on these raw material powders. A weight ratio of the fine powder to the main powder was set so as to satisfy "fine powder:main powder=3:7", and a content of the epoxy resin contained in the granules was 2.00 parts by weight with respect to 100 parts by weight of the magnetic powder. Magnetic cores of Sample M1 to Sample M11 were obtained under the same experiment condition as in Experiment 1 except for the above.

Sample M12 to Sample M22

In Sample M12 to Sample M22, polyethylene glycol (PEG) was added as the modifier. In Sample M12, the modifier was added in the one-stage kneading step under Condition A, and in Sample M13 to Sample M22, in the two-stage kneading step under Condition E, the above modifier was added in both the primary kneading and the secondary kneading. An adding amount of the modifier in each sample was set so that a content (wt %) of the modifier with respect to a total amount of the magnetic core becomes a value shown in Table 5.

In each of Sample M12 to Sample M22, the raw material powder for fine powder is the crystalline pure iron powder having an average particle size of 0.59 μm, and the raw material powder for main powder is the amorphous Fe—Si—B-based alloy powder having an average particle size of 25 μm. The insulating coatings having the same material and average thickness as in Experiment 1 were formed on these raw material powders. A weight ratio of the fine powder to the main powder was set so as to satisfy "fine powder:main powder=3:7", and a content of the epoxy resin contained in the granules was 2.00 parts by weight with respect to 100 parts by weight of the magnetic powder. Magnetic cores of Sample M12 to Sample M22 were obtained under the same experiment condition as in Experiment 1 except for the above.

For each sample in Experiment 2, the same methods as in Experiment 1 were used to perform cross section analysis of the magnetic core, evaluation of withstand voltage characteristics, and evaluation of DC bias characteristics. In this experiment, the averages of the Heywood diameters of the fine powder and the main powder measured by the cross section analysis of the magnetic core were generally consistent with the average sizes of the raw material powders. In Experiment 2, the withstand voltage of Sample A1, which is a Comparative Example, was used as a reference, so that improvement rates in withstand voltage of the other samples were evaluated. As for the DC bias characteristics, similarly to the withstand voltage, Isat of Sample A1, which is a Comparative Example, was used as a reference, so that improvement rates in DC bias characteristics of the other samples were evaluated. Table 2 shows evaluation results of Sample A1 to Sample A12, Table 3 shows evaluation results of Sample E1 to Sample E15, Table 4 shows evaluation results of Sample M1 to Sample M11, and Table 5 shows evaluation results of Sample M12 to Sample M22.

TABLE 2

| | | Production condition | | | | | | | | | | | | |
|---|---|---|---|---|---|---|---|---|---|---|---|---|---|---|
| | Example/ | | Average Size (μm) | | Resin content | Modifier | | Cross section analysis | | | | | Core characteristics | |
| Sample No. | Comparative Example | Kneading condition | Fine powder | Main powder | (part by weight) | Type | Content (wt %) | L1av (μm) | (L1av/dav) × 100 | L2av (μm) | σ (μm) | Withstand voltage | Isat |
| A1 | Comp.Ex | A | 0.59 | 25 | 2.00 | — | 0.000 | 0.020 | 3.4 | 0.128 | 0.23 | Reference | Reference |
| A2 | Comp.Ex | A | 0.59 | 25 | 2.00 | PPG | 0.025 | 0.021 | 3.6 | 0.127 | 0.22 | F | F |
| A3 | Comp.Ex | A | 0.59 | 25 | 2.00 | PPG | 0.050 | 0.021 | 3.6 | 0.127 | 0.22 | F | F |
| A4 | Comp.Ex | A | 0.59 | 25 | 2.00 | PPG | 0.075 | 0.021 | 3.6 | 0.125 | 0.22 | F | F |
| A5 | Comp.Ex | A | 0.59 | 25 | 2.00 | PPG | 0.100 | 0.023 | 3.9 | 0.125 | 0.22 | F | F |
| A6 | Comp.Ex | A | 0.59 | 25 | 2.00 | PPG | 0.150 | 0.023 | 3.9 | 0.123 | 0.21 | F | F |
| A7 | Comp.Ex | A | 0.59 | 25 | 2.00 | PPG | 0.200 | 0.023 | 3.9 | 0.121 | 0.20 | F | F |
| A8 | Comp.Ex | A | 0.59 | 25 | 2.00 | PPG | 0.250 | 0.023 | 3.9 | 0.121 | 0.19 | F | F |
| A9 | Comp.Ex | A | 0.59 | 25 | 2.00 | PPG | 0.300 | 0.023 | 3.9 | 0.121 | 0.19 | F | F |
| A10 | Comp.Ex | A | 0.59 | 25 | 2.00 | PPG | 0.400 | 0.023 | 3.9 | 0.127 | 0.23 | F | F |
| A11 | Comp.Ex | A | 0.59 | 25 | 2.00 | PPG | 0.500 | 0.023 | 3.9 | 0.135 | 0.26 | F | F |
| A12 | Comp.Ex | A | 0.59 | 25 | 2.00 | PPG | 0.600 | 0.023 | 3.9 | 0.145 | 0.29 | F | F |

TABLE 3

| | | Production condition | | | | | | | | | | | | |
|---|---|---|---|---|---|---|---|---|---|---|---|---|---|---|
| | Example/ | | Average Size (μm) | | Resin content | Modifier | | Cross section analysis | | | | | Core characteristics | |
| Sample No. | Comparative Example | Kneading condition | Fine powder | Main powder | (part by weight) | Type | Content (wt %) | L1av (μm) | (L1av/dav) × 100 | L2av (μm) | σ (μm) | Withstand voltage | Isat |
| A1 | Comp. EX | A | 0.59 | 25 | 2.00 | — | 0.000 | 0.020 | 3.4 | 0.128 | 0.23 | Reference | Reference |
| E1 | Example | E | 0.59 | 25 | 2.00 | — | 0.000 | 0.370 | 62.7 | 0.121 | 0.22 | G | G |
| E2 | Example | E | 0.59 | 25 | 2.00 | PPG | 0.025 | 0.220 | 37.3 | 0.111 | 0.21 | G | G |
| E3 | Example | E | 0.59 | 25 | 2.00 | PPG | 0.050 | 0.200 | 33.9 | 0.098 | 0.18 | G | G |
| E4 | Example | E | 0.59 | 25 | 2.00 | PPG | 0.075 | 0.180 | 30.5 | 0.075 | 0.17 | G | G |
| E5 | Example | E | 0.59 | 25 | 2.00 | PPG | 0.100 | 0.143 | 24.2 | 0.051 | 0.08 | G | G |
| E6 | Example | E | 0.59 | 25 | 2.00 | PPG | 0.150 | 0.130 | 22.0 | 0.047 | 0.07 | G | G |
| E7 | Example | E | 0.59 | 25 | 2.00 | PPG | 0.200 | 0.101 | 17.1 | 0.048 | 0.06 | VG | VG |
| E8 | Example | E | 0.59 | 25 | 2.00 | PPG | 0.250 | 0.103 | 17.5 | 0.050 | 0.08 | VG | VG |
| E9 | Example | E | 0.59 | 25 | 2.00 | PPG | 0.300 | 0.110 | 18.6 | 0.059 | 0.09 | VG | VG |
| E10 | Example | E | 0.59 | 25 | 2.00 | PPG | 0.400 | 0.180 | 30.5 | 0.080 | 0.13 | G | G |
| E11 | Example | E | 0.59 | 25 | 2.00 | PPG | 0.500 | 0.270 | 45.8 | 0.120 | 0.14 | G | G |
| E12 | Comp. EX | E | 0.59 | 25 | 2.00 | PPG | 0.600 | 0.290 | 49.2 | 0.140 | 0.27 | F | F |
| E13 | Example | E | 0.59 | 25 | 1.50 | PPG | 0.150 | 0.030 | 5.0 | 0.088 | 0.15 | G | G |
| E14 | Example | E | 0.59 | 25 | 1.75 | PPG | 0.175 | 0.091 | 15.5 | 0.110 | 0.18 | G | G |
| E15 | Example | E | 0.59 | 15 | 1.50 | PPG | 0.225 | 0.131 | 22.2 | 0.020 | 0.06 | G | G |

TABLE 4

| Sample No. | Example/ Comparative Example | Production condition: Kneading condition | Production condition: Modifier Type | Production condition: Modifier Content (wt %) | Cross section analysis: L1av (μm) | Cross section analysis: (L1av/dav) × 100 | Cross section analysis: L2av (μm) | Cross section analysis: σ (μm) | Core characteristics: Withstand voltage | Core characteristics: Isat |
|---|---|---|---|---|---|---|---|---|---|---|
| A1 | Comp.Ex | A | — | 0.000 | 0.020 | 3.4 | 0.128 | 0.23 | Reference | Reference |
| M1 | Comp.Ex | A | PCL | 0.050 | 0.022 | 3.7 | 0.127 | 0.22 | F | F |
| M2 | Example | E | PCL | 0.050 | 0.200 | 33.9 | 0.098 | 0.20 | G | G |
| M3 | Example | E | PCL | 0.100 | 0.143 | 24.2 | 0.075 | 0.11 | G | G |
| M4 | Example | E | PCL | 0.150 | 0.130 | 22.0 | 0.067 | 0.09 | G | G |
| M5 | Example | E | PCL | 0.200 | 0.100 | 16.9 | 0.050 | 0.09 | VG | VG |
| M6 | Example | E | PCL | 0.250 | 0.104 | 17.6 | 0.051 | 0.09 | VG | VG |
| M7 | Example | E | PCL | 0.300 | 0.150 | 25.4 | 0.085 | 0.15 | G | G |
| M8 | Example | E | PCL | 0.350 | 0.165 | 28.0 | 0.085 | 0.16 | G | G |
| M9 | Example | E | PCL | 0.400 | 0.180 | 30.5 | 0.087 | 0.13 | G | G |
| M10 | Example | E | PCL | 0.500 | 0.270 | 45.8 | 0.120 | 0.14 | G | G |
| M11 | Comp.Ex | E | PCL | 0.600 | 0.290 | 49.2 | 0.140 | 0.27 | F | F |

TABLE 5

| Sample No. | Example/ Comparative Example | Production condition: Kneading condition | Production condition: Modifier Type | Production condition: Modifier Content (wt %) | Cross section analysis: L1av (μm) | Cross section analysis: (L1av/dav) × 100 | Cross section analysis: L2av (μm) | Cross section analysis: σ (μm) | Core characteristics: Withstand voltage | Core characteristics: Isat |
|---|---|---|---|---|---|---|---|---|---|---|
| A1 | Copm. Ex | A | — | 0.000 | 0.020 | 3.4 | 0.128 | 0.23 | Reference | Reference |
| M12 | Copm. Ex | A | PEG | 0.050 | 0.023 | 3.9 | 0.128 | 0.23 | F | F |
| M13 | Example | E | PEG | 0.050 | 0.203 | 34.4 | 0.100 | 0.22 | G | G |
| M14 | Example | E | PEG | 0.100 | 0.145 | 24.6 | 0.079 | 0.14 | G | G |
| M15 | Example | E | PEG | 0.150 | 0.141 | 23.9 | 0.075 | 0.12 | G | G |
| M16 | Example | E | PEG | 0.200 | 0.100 | 17.0 | 0.056 | 0.10 | VG | VG |
| M17 | Example | E | PEG | 0.250 | 0.105 | 17.8 | 0.055 | 0.10 | VG | VG |
| M18 | Example | E | PEG | 0.300 | 0.114 | 19.3 | 0.089 | 0.18 | G | G |
| M19 | Example | E | PEG | 0.350 | 0.171 | 29.0 | 0.090 | 0.21 | G | G |
| M20 | Example | E | PEG | 0.400 | 0.190 | 32.2 | 0.100 | 0.22 | G | G |
| M21 | Example | E | PEG | 0.500 | 0.285 | 48.3 | 0.120 | 0.24 | G | G |
| M22 | Copm. Ex | E | PEG | 0.600 | 0.325 | 55.1 | 0.141 | 0.28 | F | F |

As shown in Table 2, in Sample A1 to Sample A12 in which the one-stage kneading in the related art was performed, even when the modifier was added, ((L1av/dav)×100) was less than 5, and the effect of improving the withstand voltage and DC bias characteristics was not obtained. As shown in Table 3, among the samples subjected to the two-stage kneading, in Sample E2 to Sample Ell and Sample E13 to Sample E15 to which a predetermined amount of the modifier was added, magnetic cores that satisfy $5 \le ((L1av/dav) \times 100) \le 70$, $0.02\ \mu m \le L2av \le 0.13\ \mu m$, and $\sigma \le 0.25\ \mu m$ were obtained. In the samples whose L1av/dav, L2av, and σ satisfy the above requirements, both the withstand voltage and the DC bias characteristics could be improved.

From the results shown in Tables 4 and 5, it was found that the same evaluation results as those of Sample E1 to Sample E15 were obtained even when the types of modifiers were changed.

From the results shown in Tables 2 to 5 of Experiment 2, it was found that L1av/dav, L2av, and σ can be controlled within desired ranges by the modifier and the adding amount of the modifier. From the results of Experiment 1 and Experiment 2 (Tables 1 to 5), it was found that when Requirement 1 "$5 \le ((L1av/dav) \times 100) \le 70$", Requirement 2 "$0.02\ \mu m \le L2av \le 0.13\ \mu m$", and Requirement 3 "$\sigma \le 0.25\ \mu m$" are all satisfied, both the withstand voltage and DC bias characteristics can be improved. Note that in each sample of Experiments 1 and 2, A1/A2 was within a range of 60% to 90%.

Experiment 3

In Experiment 3, magnetic cores of Sample LS1 to Sample LS70 and Sample SS1 to Sample SS16 were manufactured by changing the average particle size of the fine powder and the main powder. In Sample LS1 to Sample LS70, raw material powders for fine powder have the same average particle size, and raw material powders for main powder having the average particle sizes shown in Tables 6 to 15 were used. In Sample SS1 to Sample SS16, raw material powders for main powder have the same average particle size, and raw material powders for fine powder having the average particle sizes shown in Table 16 were used.

Experiment conditions other than the above in Experiment 3 were the same as those in Experiment 2. That is, in each sample of Experiment 3, the raw material powder for fine powder was the crystalline pure iron powder including the insulating coating, and the raw material powder for main powder was the amorphous Fe—Si—B-based alloy powder including the insulating coating. A weight ratio of the fine powder to the main powder was set so as to satisfy "finepowder:mainpowder=3:7", and a content of the epoxy resin contained in the granules was 2.00 parts by weight with respect to 100 parts by weight of the magnetic powder.

For each sample in Experiment 3, the same methods as in Experiment 1 were used to perform cross section analysis of the magnetic core, evaluation of withstand voltage characteristics, and evaluation of DC bias characteristics. In cross section observation of the magnetic core, the Heywood diameters of fine powder and main powder were measured. As a result, in the present experiment, both the average particle size of the fine powder and the average particle size of the main powder observed in the cross section were consistent with the average particle sizes of the raw material powder shown in Tables 6 to 16. In Experiment 3, using samples in which the kneading step was performed under Condition A and to which no modifier was added (Sample LS1, Sample LS8, Sample LS15, Sample LS22, Sample LS29, Sample LS36, Sample LS43, Sample LS50, Sample LS57, Sample LS64, and Sample A1) as a reference, the withstand voltage characteristics and DC bias characteristics were evaluated.

Tables 6 to 15 show evaluation results of Samples LS1 to LS70, and Table 16 shows evaluation results of Sample SS1 to Sample SS16.

TABLE 6

| Sample No. | Example/ Comparative Example | Production condition: Kneading condition | Average size (μm): Fine powder | Average size (μm): Main powder | Modifier: Type | Modifier: Content (wt %) | Cross section analysis: (L1av/dav) × 100 | Cross section analysis: L2av (μm) | Cross section analysis: σ (μm) | Core characteristics: Withstand voltage | Core characteristics: Isat |
|---|---|---|---|---|---|---|---|---|---|---|---|
| LS1 | Comp. Ex | A | 0.59 | 4 | — | 0.0 | 3.5 | 0.019 | 0.06 | Reference | Reference |
| LS2 | Comp. Ex | E | 0.59 | 4 | — | 0.0 | 35.6 | 0.018 | 0.05 | F | F |
| LS3 | Comp. Ex | E | 0.59 | 4 | PPG | 0.1 | 15.2 | 0.015 | 0.05 | F | F |
| LS4 | Comp. Ex | E | 0.59 | 4 | PPG | 0.2 | 13.8 | 0.012 | 0.04 | F | F |
| LS5 | Comp. Ex | E | 0.59 | 4 | PPG | 0.3 | 13.5 | 0.010 | 0.04 | F | F |
| LS6 | Comp. Ex | E | 0.59 | 4 | PPG | 0.4 | 15.6 | 0.015 | 0.05 | F | F |
| LS7 | Comp. Ex | E | 0.59 | 4 | PPG | 0.5 | 23.7 | 0.016 | 0.06 | F | F |

TABLE 7

| Sample No. | Example/ Comparative Example | Production condition: Kneading condition | Average size (μm): Fine powder | Average size (μm): Main powder | Modifier: Type | Modifier: Content (wt %) | Cross section analysis: (L1av/dav) × 100 | Cross section analysis: L2av (μm) | Cross section analysis: σ (μm) | Core characteristics: Withstand voltage | Core characteristics: Isat |
|---|---|---|---|---|---|---|---|---|---|---|---|
| LS8 | Comp. Ex | A | 0.59 | 5 | — | 0.0 | 4.2 | 0.125 | 0.23 | Reference | Reference |
| LS9 | Example | E | 0.59 | 5 | — | 0.0 | 70.0 | 0.121 | 0.22 | G | G |
| LS10 | Example | E | 0.59 | 5 | PPG | 0.1 | 21.7 | 0.100 | 0.19 | G | G |
| LS11 | Example | E | 0.59 | 5 | PPG | 0.2 | 20.7 | 0.100 | 0.18 | G | G |
| LS12 | Example | E | 0.59 | 5 | PPG | 0.3 | 16.9 | 0.045 | 0.10 | VG | VG |
| LS13 | Example | E | 0.59 | 5 | PPG | 0.4 | 16.9 | 0.055 | 0.12 | VG | VG |
| LS14 | Example | E | 0.59 | 5 | PPG | 0.5 | 28.8 | 0.071 | 0.14 | G | G |

TABLE 8

| Sample No. | Example/ Comparative Example | Production condition: Kneading condition | Average size (μm): Fine powder | Average size (μm): Main powder | Modifier: Type | Modifier: Content (wt %) | Cross section analysis: (L1av/dav) × 100 | Cross section analysis: L2av (μm) | Cross section analysis: σ (μm) | Core characteristics: Withstand voltage | Core characteristics: Isat |
|---|---|---|---|---|---|---|---|---|---|---|---|
| LS15 | Comp. Ex | A | 0.59 | 10 | — | 0.0 | 4.1 | 0.125 | 0.23 | Reference | Reference |
| LS16 | Example | E | 0.59 | 10 | — | 0.0 | 65.1 | 0.116 | 0.25 | G | G |
| LS17 | Example | E | 0.59 | 10 | PPG | 0.1 | 26.3 | 0.100 | 0.23 | G | G |
| LS18 | Example | E | 0.59 | 10 | PPG | 0.2 | 23.7 | 0.090 | 0.20 | G | G |
| LS19 | Example | E | 0.59 | 10 | PPG | 0.3 | 18.6 | 0.049 | 0.10 | VG | VG |
| LS20 | Example | E | 0.59 | 10 | PPG | 0.4 | 16.9 | 0.061 | 0.11 | VG | VG |
| LS21 | Example | E | 0.59 | 10 | PPG | 0.5 | 30.5 | 0.072 | 0.14 | G | G |

TABLE 9

| Sample No. | Example/ Comparative Example | Production condition: Kneading condition | Average size (μm): Fine powder | Average size (μm): Main powder | Modifier: Type | Modifier: Content (wt %) | Cross section analysis: (L1av/dav) × 100 | Cross section analysis: L2av (μm) | Cross section analysis: σ (μm) | Core characteristics: Withstand voltage | Core characteristics: Isat |
|---|---|---|---|---|---|---|---|---|---|---|---|
| LS22 | Comp. Ex | A | 0.59 | 15 | — | 0.0 | 4.0 | 0.125 | 0.23 | Reference | Reference |
| LS23 | Example | E | 0.59 | 15 | — | 0.0 | 64.4 | 0.112 | 0.23 | G | G |
| LS24 | Example | E | 0.59 | 15 | PPG | 0.1 | 27.1 | 0.110 | 0.23 | G | G |
| LS25 | Example | E | 0.59 | 15 | PPG | 0.2 | 25.4 | 0.100 | 0.21 | G | G |
| LS26 | Example | E | 0.59 | 15 | PPG | 0.3 | 16.9 | 0.045 | 0.09 | VG | VG |
| LS27 | Example | E | 0.59 | 15 | PPG | 0.4 | 28.8 | 0.070 | 0.14 | VG | VG |
| LS28 | Example | E | 0.59 | 15 | PPG | 0.5 | 33.9 | 0.093 | 0.22 | G | G |

TABLE 10

| Sample No. | Example/ Comparative Example | Production condition: Kneading condition | Average size (μm): Fine powder | Average size (μm): Main powder | Modifier: Type | Modifier: Content (wt %) | Cross section analysis: (L1av/dav) × 100 | Cross section analysis: L2av (μm) | Cross section analysis: σ (μm) | Core characteristics: Withstand voltage | Core characteristics: Isat |
|---|---|---|---|---|---|---|---|---|---|---|---|
| LS29 | Comp. Ex | A | 0.59 | 20 | — | 0.0 | 3.9 | 0.124 | 0.22 | Reference | Reference |
| LS30 | Example | E | 0.59 | 20 | — | 0.0 | 62.7 | 0.110 | 0.24 | G | G |
| LS31 | Example | E | 0.59 | 20 | PPG | 0.1 | 28.8 | 0.100 | 0.24 | G | G |
| LS32 | Example | E | 0.59 | 20 | PPG | 0.2 | 17.6 | 0.041 | 0.09 | G | G |
| LS33 | Example | E | 0.59 | 20 | PPG | 0.3 | 16.9 | 0.055 | 0.09 | VG | VG |
| LS34 | Example | E | 0.59 | 20 | PPG | 0.4 | 27.1 | 0.075 | 0.14 | VG | VG |
| LS35 | Example | E | 0.59 | 20 | PPG | 0.5 | 37.5 | 0.101 | 0.24 | G | G |

TABLE 11

| Sample No. | Example/ Comparative Example | Production condition: Kneading condition | Average size (μm): Fine powder | Average size (μm): Main powder | Modifier: Type | Modifier: Content (wt %) | Cross section analysis: (L1av/dav) × 100 | Cross section analysis: L2av (μm) | Cross section analysis: σ (μm) | Core characteristics: Withstand voltage | Core characteristics: Isat |
|---|---|---|---|---|---|---|---|---|---|---|---|
| LS36 | Comp. Ex | A | 0.59 | 25 | — | 0.0 | 3.8 | 0.123 | 0.22 | Reference | Reference |
| LS37 | Example | E | 0.59 | 25 | — | 0.0 | 62.7 | 0.109 | 0.20 | G | G |
| LS38 | Example | E | 0.59 | 25 | PPG | 0.1 | 25.4 | 0.052 | 0.10 | G | G |
| LS39 | Example | E | 0.59 | 25 | PPG | 0.2 | 16.9 | 0.047 | 0.06 | G | G |
| LS40 | Example | E | 0.59 | 25 | PPG | 0.3 | 18.6 | 0.059 | 0.08 | VG | VG |
| LS41 | Example | E | 0.59 | 25 | PPG | 0.4 | 28.8 | 0.081 | 0.14 | VG | VG |
| LS42 | Example | E | 0.59 | 25 | PPG | 0.5 | 40.7 | 0.130 | 0.17 | G | G |

TABLE 12

| Sample No. | Example/ Comparative Example | Production condition: Kneading condition | Average size (μm): Fine powder | Average size (μm): Main powder | Modifier: Type | Modifier: Content (wt %) | Cross section analysis: (L1av/dav) × 100 | Cross section analysis: L2av (μm) | Cross section analysis: σ (μm) | Core characteristics: Withstand voltage | Core characteristics: Isat |
|---|---|---|---|---|---|---|---|---|---|---|---|
| LS43 | Comp. Ex | A | 0.59 | 30 | — | 0.0 | 3.8 | 0.120 | 0.22 | Reference | Reference |
| LS44 | Example | E | 0.59 | 30 | — | 0.0 | 57.6 | 0.105 | 0.16 | G | G |
| LS45 | Example | E | 0.59 | 30 | PPG | 0.1 | 27.1 | 0.061 | 0.12 | G | G |

TABLE 12-continued

| Sample No. | Example/ Comparative Example | Production condition: Kneading condition | Average size (μm): Fine powder | Average size (μm): Main powder | Modifier: Type | Modifier: Content (wt %) | Cross section analysis: (L1av/dav) × 100 | Cross section analysis: L2av (μm) | Cross section analysis: σ (μm) | Core characteristics: Withstand voltage | Core characteristics: Isat |
|---|---|---|---|---|---|---|---|---|---|---|---|
| LS46 | Example | E | 0.59 | 30 | PPG | 0.2 | 21.2 | 0.046 | 0.07 | G | G |
| LS47 | Example | E | 0.59 | 30 | PPG | 0.3 | 25.3 | 0.058 | 0.10 | VG | VG |
| LS48 | Example | E | 0.59 | 30 | PPG | 0.4 | 33.6 | 0.085 | 0.15 | VG | VG |
| LS49 | Example | E | 0.59 | 30 | PPG | 0.5 | 40.1 | 0.125 | 0.16 | G | G |

TABLE 13

| Sample No. | Example/ Comparative Example | Production condition: Kneading condition | Average size (μm): Fine powder | Average size (μm): Main powder | Modifier: Type | Modifier: Content (wt %) | Cross section analysis: (L1av/dav) × 100 | Cross section analysis: L2av (μm) | Cross section analysis: σ (μm) | Core characteristics: Withstand voltage | Core characteristics: Isat |
|---|---|---|---|---|---|---|---|---|---|---|---|
| LS50 | Comp. Ex | A | 0.59 | 35 | — | 0.0 | 3.8 | 0.122 | 0.23 | Reference | Reference |
| LS51 | Example | E | 0.59 | 35 | — | 0.0 | 55.9 | 0.111 | 0.15 | G | G |
| LS52 | Example | E | 0.59 | 35 | PPG | 0.1 | 22.5 | 0.060 | 0.09 | G | G |
| LS53 | Example | E | 0.59 | 35 | PPG | 0.2 | 22.4 | 0.060 | 0.09 | G | G |
| LS54 | Example | E | 0.59 | 35 | PPG | 0.3 | 27.4 | 0.070 | 0.11 | VG | VG |
| LS55 | Example | E | 0.59 | 35 | PPG | 0.4 | 35.6 | 0.080 | 0.16 | VG | VG |
| LS56 | Example | E | 0.59 | 35 | PPG | 0.5 | 43.2 | 0.123 | 0.17 | G | G |

TABLE 14

| Sample No. | Example/ Comparative Example | Production condition: Kneading condition | Average size (μm): Fine powder | Average size (μm): Main powder | Modifier: Type | Modifier: Content (wt %) | Cross section analysis: (L1av/dav) × 100 | Cross section analysis: L2av (μm) | Cross section analysis: σ (μm) | Core characteristics: Withstand voltage | Core characteristics: Isat |
|---|---|---|---|---|---|---|---|---|---|---|---|
| LS57 | Comp. Ex | A | 0.59 | 39 | — | 0.0 | 4.0 | 0.124 | 0.23 | Reference | Reference |
| LS58 | Example | E | 0.59 | 39 | — | 0.0 | 59.3 | 0.120 | 0.19 | G | G |
| LS59 | Example | E | 0.59 | 39 | PPG | 0.1 | 22.0 | 0.080 | 0.10 | G | G |
| LS60 | Example | E | 0.59 | 39 | PPG | 0.2 | 24.4 | 0.095 | 0.15 | G | G |
| LS61 | Example | E | 0.59 | 39 | PPG | 0.3 | 30.5 | 0.095 | 0.17 | VG | VG |
| LS62 | Example | E | 0.59 | 39 | PPG | 0.4 | 37.3 | 0.097 | 0.18 | VG | VG |
| LS63 | Example | E | 0.59 | 39 | PPG | 0.5 | 49.2 | 0.100 | 0.21 | G | G |

TABLE 15

| Sample No. | Example/ Comparative Example | Production condition: Kneading condition | Average size (μm): Fine powder | Average size (μm): Main powder | Modifier: Type | Modifier: Content (wt %) | Cross section analysis: (L1av/dav) × 100 | Cross section analysis: L2av (μm) | Cross section analysis: σ (μm) | Core characteristics: Withstand voltage | Core characteristics: Isat |
|---|---|---|---|---|---|---|---|---|---|---|---|
| LS64 | Comp. Ex | A | 0.59 | 40 | — | 0.0 | 4.5 | 0.175 | 0.32 | Reference | Reference |
| LS65 | Comp. Ex | E | 0.59 | 40 | — | 0.0 | 75.4 | 0.165 | 0.31 | F | F |
| LS66 | Comp. Ex | E | 0.59 | 40 | PPG | 0.1 | 49.2 | 0.160 | 0.31 | F | F |
| LS67 | Comp. Ex | E | 0.59 | 40 | PPG | 0.2 | 42.4 | 0.155 | 0.30 | F | F |
| LS68 | Comp. Ex | E | 0.59 | 40 | PPG | 0.3 | 44.1 | 0.155 | 0.27 | F | F |
| LS69 | Comp. Ex | E | 0.59 | 40 | PPG | 0.4 | 49.2 | 0.150 | 0.27 | F | F |
| LS70 | Comp. Ex | E | 0.59 | 40 | PPG | 0.5 | 59.3 | 0.165 | 0.32 | F | F |

TABLE 16

| | | | Production condition | | | | Cross section analysis | | | Core characteristics | |
|---|---|---|---|---|---|---|---|---|---|---|---|
| | Example/ | | Average size (μm) | | Modifier | | | | | | |
| Sample No. | Comparative Example | Kneading condition | Fine powder | Main powder | Type | Content (wt %) | (L1av/dav) × 100 | L2av (μm) | σ (μm) | Withstand voltage | Isat |
| A1 | Comp. Ex | A | 0.59 | 25 | — | 0.00 | 3.4 | 0.128 | 0.23 | Reference | Reference |
| SS1 | Comp. Ex | A | 0.40 | 25 | PPG | 0.05 | 4.5 | 0.127 | 0.18 | F | F |
| SS2 | Example | E | 0.40 | 25 | PPG | 0.05 | 16.5 | 0.048 | 0.03 | Ex | VG |
| SS3 | Comp. Ex | A | 0.50 | 25 | PPG | 0.05 | 4.4 | 0.125 | 0.18 | F | F |
| SS4 | Example | E | 0.50 | 25 | PPG | 0.05 | 17.5 | 0.050 | 0.04 | Ex | VG |
| SS5 | Comp. Ex | A | 0.60 | 25 | PPG | 0.05 | 4.2 | 0.122 | 0.20 | F | F |
| SS6 | Example | E | 0.60 | 25 | PPG | 0.05 | 33.0 | 0.101 | 0.17 | VG | G |
| SS7 | Comp. Ex | A | 0.70 | 25 | PPG | 0.05 | 4.1 | 0.123 | 0.20 | F | F |
| SS8 | Example | E | 0.70 | 25 | PPG | 0.05 | 33.0 | 0.105 | 0.18 | VG | G |
| SS9 | Comp. Ex | A | 0.80 | 25 | PPG | 0.05 | 3.8 | 0.121 | 0.18 | F | F |
| SS10 | Example | E | 0.80 | 25 | PPG | 0.05 | 32.5 | 0.106 | 0.19 | VG | G |
| SS11 | Comp. Ex | A | 0.90 | 25 | PPG | 0.05 | 3.7 | 0.124 | 0.20 | F | F |
| SS12 | Example | E | 0.90 | 25 | PPG | 0.05 | 31.0 | 0.119 | 0.15 | VG | G |
| SS13 | Comp. Ex | A | 1.00 | 25 | PPG | 0.05 | 3.5 | 0.115 | 0.21 | F | F |
| SS14 | Example | E | 1.00 | 25 | PPG | 0.05 | 31.5 | 0.126 | 0.21 | G | G |
| SS15 | Comp. Ex | A | 1.10 | 25 | PPG | 0.05 | 3.1 | 0.140 | 0.27 | F | F |
| SS16 | Comp. Ex | E | 1.10 | 25 | PPG | 0.05 | 32.0 | 0.142 | 0.28 | F | F |

From the results shown in Tables 6 to 16, it was found that the average particle sizes of the fine powder and the main powder affects L1av/dav, L2av, and σ. That is, it was found that L1av/dav, L2av, and σ can be controlled within desired ranges by appropriately adjusting the kneading conditions, the average particle sizes of the raw material powders, and the modifier.

From the results in Table 16, it was found that the smaller the average particle size of the fine powder, the more improved the withstand voltage characteristics and the DC bias characteristics (especially the withstand voltage characteristics). It was found that the average particle size of the fine powder is preferably less than 1 and particularly preferably 0.5 μm or less.

Experiment 4

In Experiment 4, the experiments were conducted while changing the adding amounts of the epoxy resin, and magnetic cores according to Sample P1 to Sample P7 were manufactured. The adding amount of the epoxy resin was set so that A1/A2 in the magnetic core of each sample was the value shown in Table 17. Production conditions other than the above in Experiment 4 were the same as those in Experiment 2. For each sample in Experiment 4, the same methods as in Experiment 1 were used to perform cross section analysis of the magnetic core, evaluation of withstand voltage characteristics, and evaluation of DC bias characteristics. In Experiment 4, using a sample in which the kneading step was performed under Condition A and to which no modifier was added (Sample A1 of Experiment 2) as a reference, the withstand voltage characteristics and DC bias characteristics were evaluated. Table 17 shows evaluation results of Experiment 4.

TABLE 17

| | | | Production condition | | Cross section analysis | | | | | Core characteristics | |
|---|---|---|---|---|---|---|---|---|---|---|---|
| | Example/ | | Modifier | | | | | | | | |
| Sample No. | Comparative Example | Kneading condition | Type | Content (wt %) | A1/A2 (%) | L1av (μm) | (L1av/dav) × 100 | L2av (μm) | σ (μm) | Withstand voltage | Isat |
| A1 | Comp. Ex | A | — | 0.000 | 80 | 0.020 | 3.4 | 0.128 | 0.23 | Reference | Reference |
| P1 | Comp. Ex | E | PPG | 0.050 | 50 | 0.510 | 86.4 | 0.151 | 0.29 | F | F |
| P2 | Comp. Ex | E | PPG | 0.050 | 59 | 0.450 | 76.3 | 0.136 | 0.27 | F | F |
| P3 | Example | E | PPG | 0.050 | 60 | 0.400 | 67.8 | 0.115 | 0.23 | G | G |
| P4 | Example | E | PPG | 0.050 | 70 | 0.290 | 49.2 | 0.101 | 0.17 | G | G |
| P5 | Example | E | PPG | 0.050 | 80 | 0.210 | 35.6 | 0.099 | 0.19 | G | G |
| P6 | Example | E | PPG | 0.050 | 90 | 0.390 | 66.1 | 0.124 | 0.22 | G | G |
| P7 | Comp. Ex | E | PPG | 0.050 | 91 | 0.800 | 135.6 | 0.172 | 0.29 | F | F |

As shown in Table 17, in Samples P1 and P2 with A1/A2 of less than 60%, L1av and L2av were larger than the desired ranges due to the low packing rate of the magnetic powder. In Sample P7 in which A1/A2 exceeded 90%, L1av and L2av exceeded the desired ranges due to deterioration in shape retaining property of the magnetic core. These Sample P1, Sample P2, and Sample P7 did not exhibit the effect of improving the withstand voltage and DC bias characteristics. In Samples P3 to P6 that satisfy 60%≤A1/A2≤90%, the withstand voltage and DC bias characteristics were improved as compared with the reference sample. From this result, it was found that by setting the area ratio A1/A2 of the magnetic powder within the range of 60% or more and 90% or less, and setting L1av/dav, L2av, and σ within predetermined ranges, both the withstand voltage and the DC bias characteristics can be improved.

Experiment 5

In Experiment 5, experiments were conducted by changing the roundness of the large particles contained in the main powder, and magnetic cores according to Sample R1 to Sample R18 were manufactured. In each sample of Experiment 5, the roundness of the large particles was controlled by appropriately adjusting a molten metal temperature, molten metal injection pressure, gas pressure, and gas flow rate during powder preparation by gas atomization. Tables 18 and 19 show an average roundness of each sample measured on the cross section of the magnetic core. Note that as shown in Table 18, Sample R1 to Sample R9 were subjected to the kneading step under Condition A in the related art, and as shown in Table 19, Sample R10 to Sample R18 were subjected to the kneading step under Condition E (two-stage kneading conditions).

Production conditions other than the above in Experiment 5 were the same as those in Experiment 2. For each sample in Experiment 5, the same methods as in Experiment 1 were used to perform cross section analysis of the magnetic core, evaluation of withstand voltage characteristics, and evaluation of DC bias characteristics. Note that in Experiment 5, using a sample in which the kneading step was performed under Condition A and to which no modifier was added (Sample A of Experiment 1) as a reference, the withstand voltage characteristics and DC bias characteristics were evaluated.

TABLE 18

| | | Production condition | | | Cross section analysis | | | | | Core characteristics | |
|---|---|---|---|---|---|---|---|---|---|---|---|
| | Example/ | | Modifier | | | | | | | | |
| Sample No. | Comparative Example | Kneading condition | Type | Content (wt %) | Roundness (—) | L1av (μm) | (L1av/dav) × 100 | L2av (μm) | σ (μm) | Withstand voltage | Isat |
| A1 | Comp. Ex | A | — | 0.000 | 0.85 | 0.020 | 3.4 | 0.128 | 0.23 | Reference | Reference |
| R1 | Comp. Ex | A | PPG | 0.050 | 0.60 | 0.024 | 4.0 | 0.136 | 0.24 | F | F |
| R2 | Comp. Ex | A | PPG | 0.050 | 0.65 | 0.023 | 3.9 | 0.133 | 0.24 | F | F |
| R3 | Comp. Ex | A | PPG | 0.050 | 0.70 | 0.022 | 3.7 | 0.127 | 0.22 | F | F |
| R4 | Comp. Ex | A | PPG | 0.050 | 0.75 | 0.022 | 3.7 | 0.126 | 0.22 | F | F |
| R5 | Comp. Ex | A | PPG | 0.050 | 0.80 | 0.022 | 3.7 | 0.123 | 0.22 | F | F |
| R6 | Comp. Ex | A | PPG | 0.050 | 0.85 | 0.021 | 3.6 | 0.123 | 0.21 | F | F |
| R7 | Comp. Ex | A | PPG | 0.050 | 0.90 | 0.020 | 3.4 | 0.121 | 0.21 | F | F |
| R8 | Comp. Ex | A | PPG | 0.050 | 0.95 | 0.019 | 3.3 | 0.124 | 0.20 | F | F |
| R9 | Comp. Ex | A | PPG | 0.050 | 0.98 | 0.019 | 3.3 | 0.123 | 0.20 | F | F |

TABLE 19

| | | Production condition | | | Cross section analysis | | | | | Core characteristics | |
|---|---|---|---|---|---|---|---|---|---|---|---|
| | Example/ | | Modifier | | | | | | | | |
| Sample No. | Comparative Example | Kneading condition | Type | Content (wt %) | Roundness (—) | L1av (μm) | (L1av/dav) × 100 | L2av (μm) | σ (μm) | Withstand voltage | Isat |
| A1 | Comp. Ex | A | — | 0.000 | 0.85 | 0.020 | 3.4 | 0.128 | 0.23 | Reference | Reference |
| R10 | Example | E | PPG | 0.050 | 0.60 | 0.227 | 38.5 | 0.125 | 0.23 | G | G |
| R11 | Example | E | PPG | 0.050 | 0.65 | 0.212 | 36.0 | 0.120 | 0.21 | G | G |
| R12 | Example | E | PPG | 0.050 | 0.70 | 0.204 | 34.5 | 0.115 | 0.19 | G | G |
| R13 | Example | E | PPG | 0.050 | 0.75 | 0.201 | 34.0 | 0.106 | 0.17 | G | G |
| R14 | Example | E | PPG | 0.050 | 0.80 | 0.124 | 21.0 | 0.065 | 0.08 | VG | VG |
| R15 | Example | E | PPG | 0.050 | 0.85 | 0.121 | 20.5 | 0.060 | 0.07 | VG | VG |
| R16 | Example | E | PPG | 0.050 | 0.90 | 0.112 | 19.0 | 0.058 | 0.07 | VG | VG |
| R17 | Example | E | PPG | 0.050 | 0.95 | 0.110 | 18.6 | 0.050 | 0.03 | Ex | Ex |
| R18 | Example | E | PPG | 0.050 | 0.98 | 0.109 | 18.5 | 0.050 | 0.02 | Ex | Ex |

As shown in Table 18, in Sample R1 to Sample R9 in which ((L1av/dav)×100) is less than 5, even if the average roundness of the large particles is adjusted, the effect of improving the withstand voltage characteristics and the DC bias characteristics was not obtained. As shown in Table 19, in Sample R10 to Sample R18 in which L1av/dav, L2av, and σ are set within predetermined ranges, the higher the average roundness of the large particles, both of the withstand voltage characteristics and DC bias characteristics were further improved. From results shown in Table 19, it was found that the average roundness of the large particles is preferably 0.80 or more, and particularly preferably 0.95 or more.

Experiment 6

In Experiment 6, the experiments were conducted while changing compounding ratios of the main powder and the fine powder, and magnetic cores according to Sample 51 to Sample S6 were manufactured. In each sample of Experiment 6, the adding amounts of raw material powder for fine powder and raw material powder for main powder in the kneading step were set so that S1/S2 becomes a value shown in Table 20. Note that S1/S2 shown in Table 20 are actual values measured by cross section analysis of the magnetic core.

Production conditions other than the above in Experiment 6 were the same as those in Experiment 2. For each sample in Experiment 6, the same methods as in Experiment 1 were used to perform cross section analysis of the magnetic core, evaluation of withstand voltage characteristics, and evaluation of DC bias characteristics. Note that in Experiment 6, using a sample in which the kneading step was performed under Condition A and to which no modifier was added (Sample A of Experiment 1) as a reference, the withstand voltage characteristics and DC bias characteristics were evaluated.

TABLE 20

| Sample No. | Example/ Comparative Example | Production condition: Kneading condition | Production condition: Modifier: Type | Production condition: Modifier: Content (wt %) | Cross section analysis: S1/S2 (%) | Cross section analysis: L1av (μm) | Cross section analysis: (L1av/dav) × 100 | Cross section analysis: L2av (μm) | Cross section analysis: σ (μm) | Core characteristics: Withstand voltage | Core characteristics: Isat |
|---|---|---|---|---|---|---|---|---|---|---|---|
| A1 | Comp. Ex | A | — | 0.000 | 0.30 | 0.020 | 3.4 | 0.128 | 0.23 | Reference | Reference |
| S1 | Example | E | PPG | 0.050 | 0.10 | 0.240 | 40.7 | 0.115 | 0.21 | G | G |
| S2 | Example | E | PPG | 0.050 | 0.20 | 0.117 | 19.8 | 0.060 | 0.09 | VG | VG |
| S3 | Example | E | PPG | 0.050 | 0.30 | 0.107 | 18.1 | 0.059 | 0.08 | VG | VG |
| S4 | Example | E | PPG | 0.050 | 0.40 | 0.110 | 18.6 | 0.058 | 0.08 | VG | VG |
| S5 | Example | E | PPG | 0.050 | 0.50 | 0.115 | 19.5 | 0.062 | 0.09 | VG | VG |
| S6 | Example | E | PPG | 0.050 | 0.60 | 0.250 | 42.4 | 0.121 | 0.21 | G | G |

As shown in Table 20, in Experiment 6, evaluation results of Sample S2 to Sample S5 were particularly good. From this result, it was found that the area ratio S1/S2 of the small particles to the large particles is preferably 0.2 or more and 0.5 or less.

Note that another experiment was conducted in which composition types (compositions of small particles and large particles) of the metal magnetic powder 10 were changed. As a result, even when the composition type of the metal magnetic powder 10 was changed, evaluation results with the same tendencies as in Experiments 1 to 6 were obtained.

DESCRIPTION OF THE REFERENCE NUMERICAL

- 2 magnetic core
  - 10 metal magnetic powder
    - 10*a* fine powder
    - 10*b* main powder
    - 11 small particle
    - 12 large particle
  - 20 resin
- 100 magnetic component
  - 5 coil
    - 5*a* end portion
    - 5*b* end portion
  - 6, 8 external electrode

What is claimed is:

1. A magnetic core, comprising:

metal magnetic powder; and resin, wherein a content of the metal magnetic powder satisfies 60%≤(A1/A2)≤90%, in which A1 is an area of the metal magnetic powder in a cross section of the magnetic core, and A2 is a total area of the metal magnetic powder and the resin in the cross section of the magnetic core, the metal magnetic powder includes small particles having the Heywood diameter of 1 μm or less in the cross section of the magnetic core and large particles having the Heywood diameter of 5 μm or more and less than 40 μm, a neighborhood region of each small particle is defined as a region within a circle with a radius of $3\times r_N$ from a centroid of each small particle as a center of the circle in the cross section of the magnetic core, in which $r_N$ is a radius of each of the small particles, L1 is defined as an edge-to-edge distance between the small particle positioned in a center of the neighborhood region of each small particle and the small particle farthest from the center in the neighborhood region of each small particle, a ratio of L1av to day satisfies 5≤((L1av/dav)×100)≤70, in which L1av is an average value of L1 and dav is an average value of the Heywood diameters of the small particles, L2 is defined as an edge-to-edge distance between a randomly selected large particle in the cross section of the magnetic core and a small particle adjacent to the randomly selected large particle, L2av is 0.02 μm or more and 0.13 μm or less, in which L2av is an average value of L2, and σ is 0.25 μm or less, in which σ is a standard deviation of L2.

2. The magnetic core according to claim 1, wherein an average roundness of the large particles in the cross section of the magnetic core is 0.8 or more.

3. The magnetic core according to claim 1, wherein a ratio of S1 to S2 satisfies $0.2 \leq (S1/S2) \leq 0.5$, in which S1 is an area of the small particles in the cross section of the magnetic core, and S2 is an area of the large particles in the cross section of the magnetic core.

4. A magnetic component comprising the magnetic core according to claim 1.

* * * * *